United States Patent

[11] 3,591,761

| [72] | Inventors | Seymour Bederman<br>Yorktown Heights;<br>Larry G. Lankford, Mahopac, both of, N.Y. |
|------|-----------|---|
| [21] | Appl. No. | 742,744 |
| [22] | Filed | July 5, 1968 |
| [45] | Patented | July 6, 1971 |
| [73] | Assignee | International Business Machines Corporation<br>Armonk, N.Y. |

[54] PATTERN AND CAVITY ELECTROEROSION BY REPEATED RASTER SCANNING
19 Claims, 20 Drawing Figs.

[52] U.S. Cl. .................................................. 219/69 V,
219/69 C, 219/69 G
[51] Int. Cl. .................................................. B23p 1/12,
B23p 1/14
[50] Field of Search .......................................... 219/69 E,
69 G, 69 F, 69 P, 69 V; 90/13, 24.3, 38, 48; 51/35,
59 SS, 165.50, 165.60; 318/18, 162; 51/165.04,
165.14

[56] References Cited
UNITED STATES PATENTS
2,580,716   1/1952   Balamuth .................... 51/59 SS 3,125,700   3/1964   Bentley et al. ................ 219/69 (G) X
3,135,852   6/1964   Bentley et al. ................ 219/69 (V)

FOREIGN PATENTS
824,001   11/1959   Great Britain ................ 219/69 (V)
1,235,514   5/1960   France ........................ 219/69 (V)

Primary Examiner—R. F. Staubly
Attorneys—Hanifin and Clark and John A. Jordan

ABSTRACT: A multiple axis machine tool control system is provided for removing layers of material from a workpiece. The system position controller repetitively moves the work element, in rectilinear parallel paths, in a scanning manner, back and forth across the workpiece between stored X- and Y-coordinate limits to remove incremental layers of material. Control of material removal in the Z-direction is dependent upon a current sensing arrangement whereby the magnitude of the current flow between the EDM work element and the workpiece is sensed and used to control the Z-direction position of the work element. The sensed current also acts to control the frequency of automatic calibration of the work element. With the EDM wire electrode stored on a reel a new section of electrode is automatically allowed to advance, during each calibration cycle, in dependence upon the amount of electrode wear.

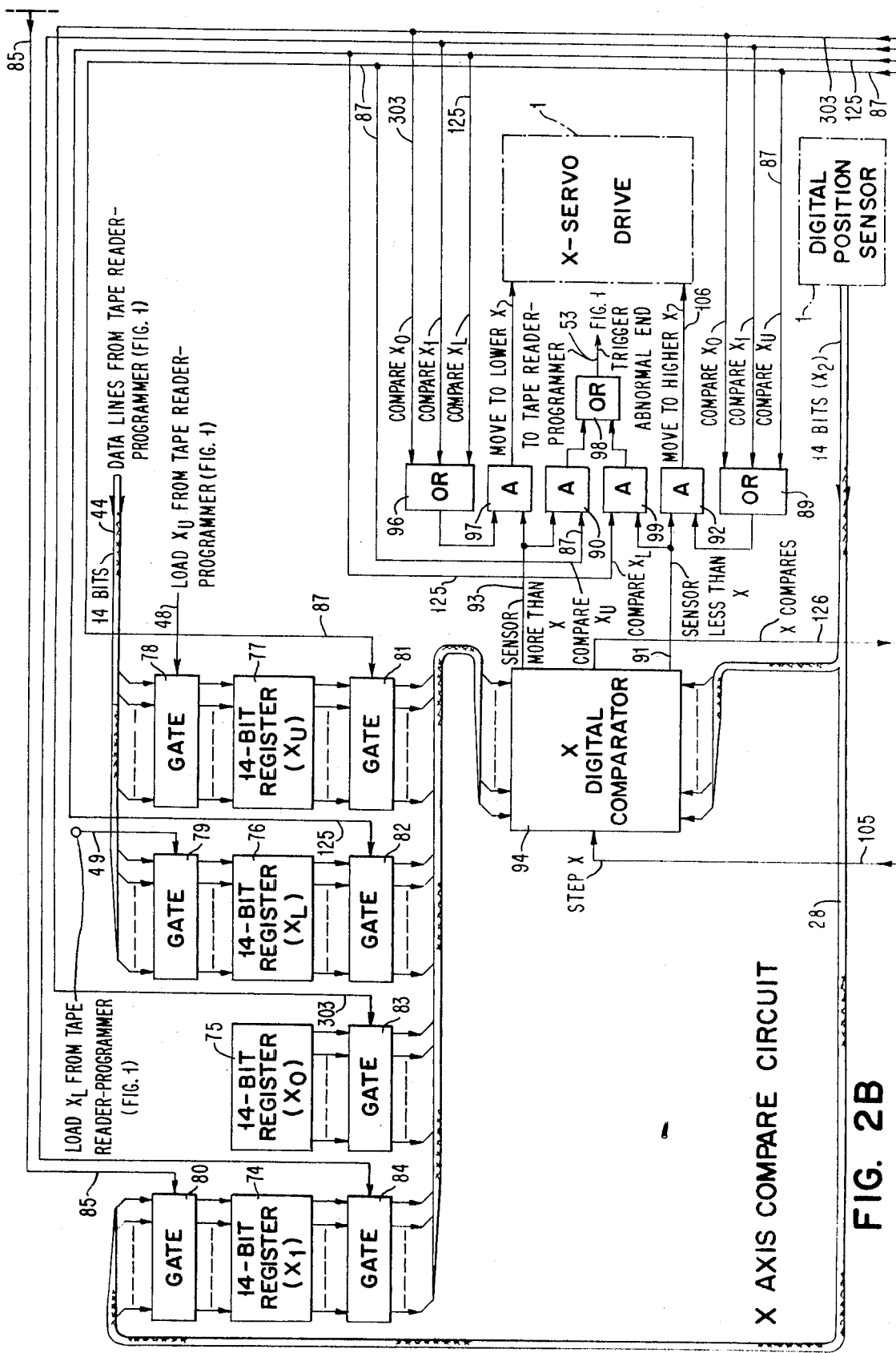
FIG. 2B  X AXIS COMPARE CIRCUIT

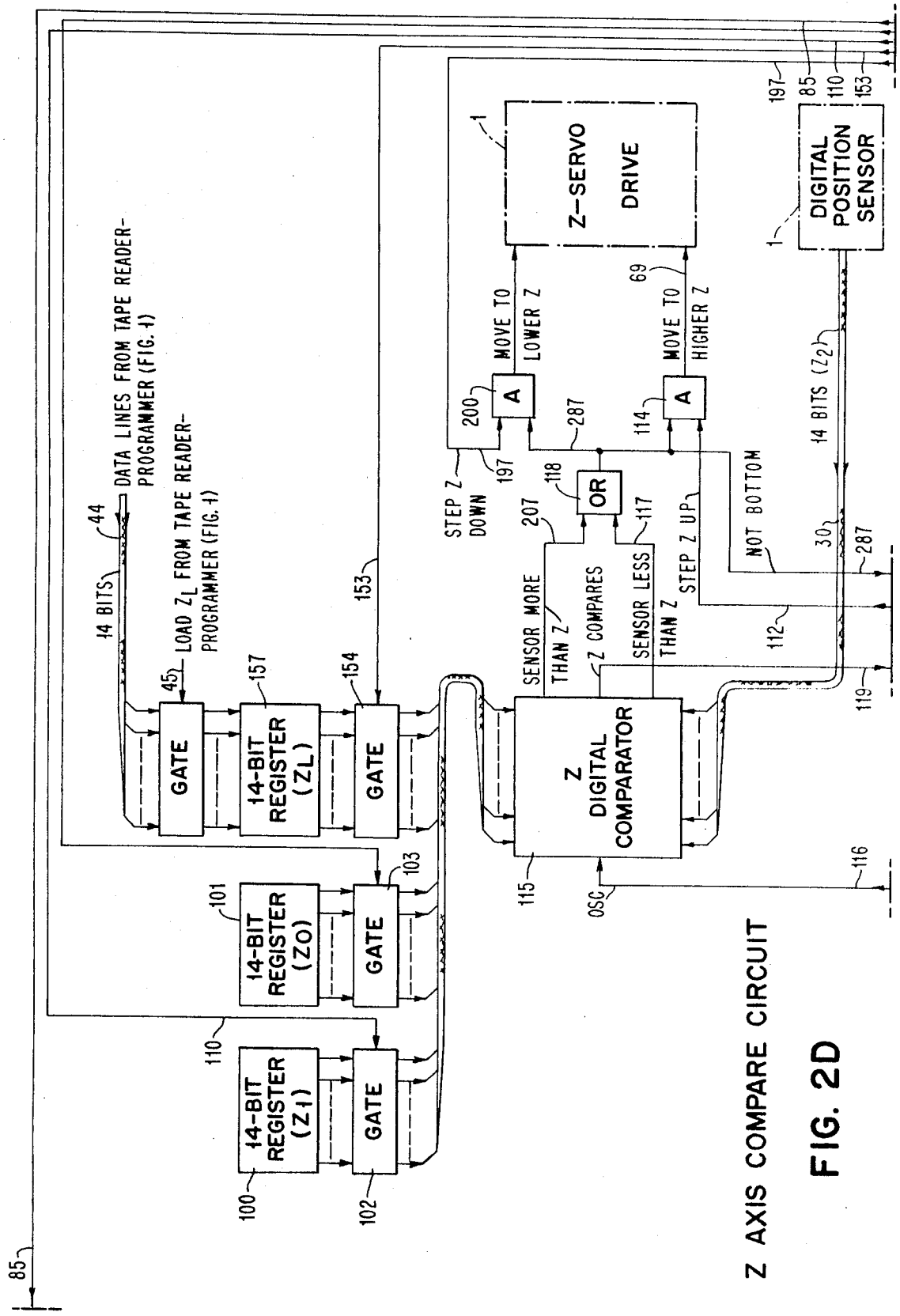

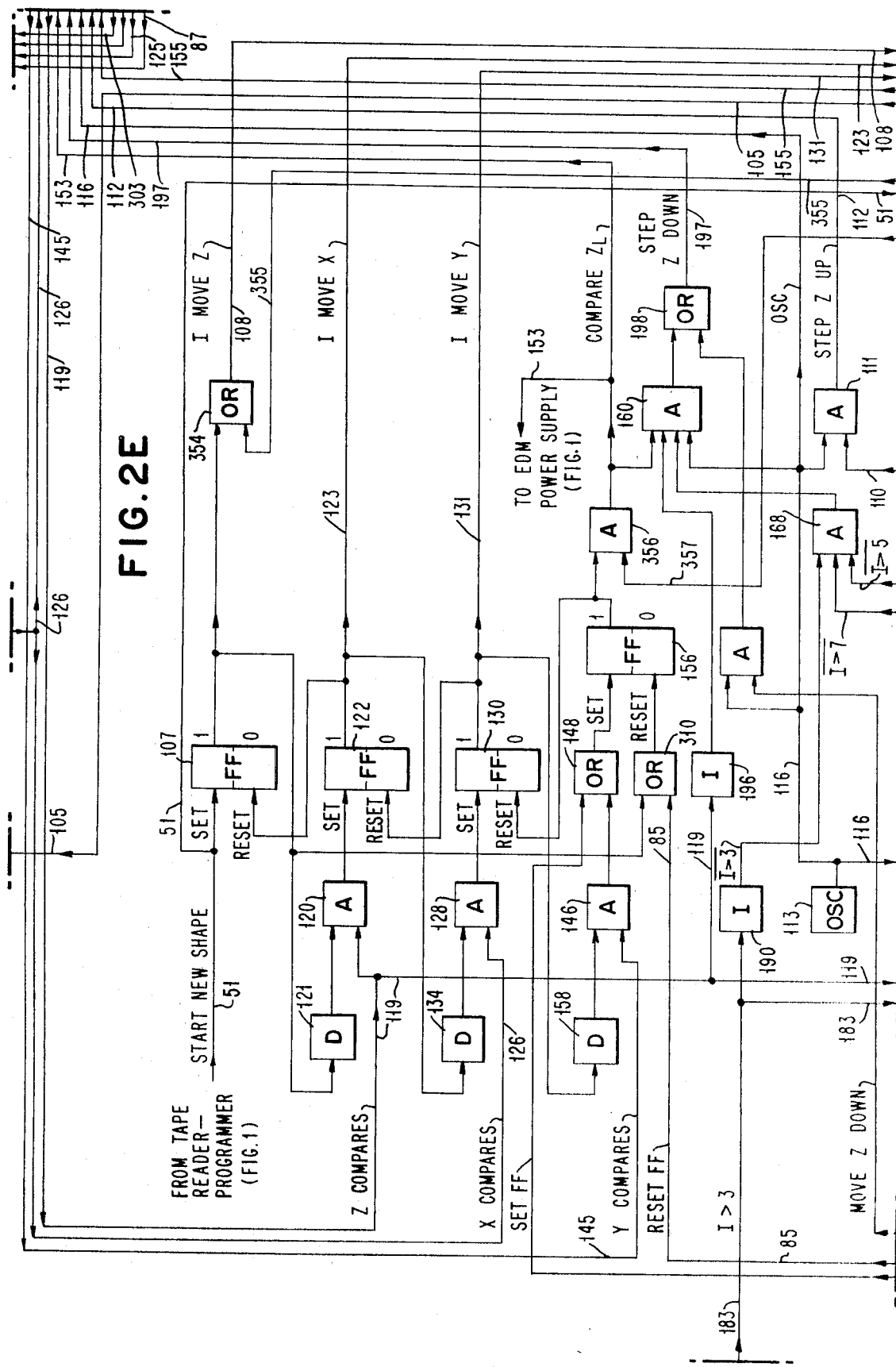

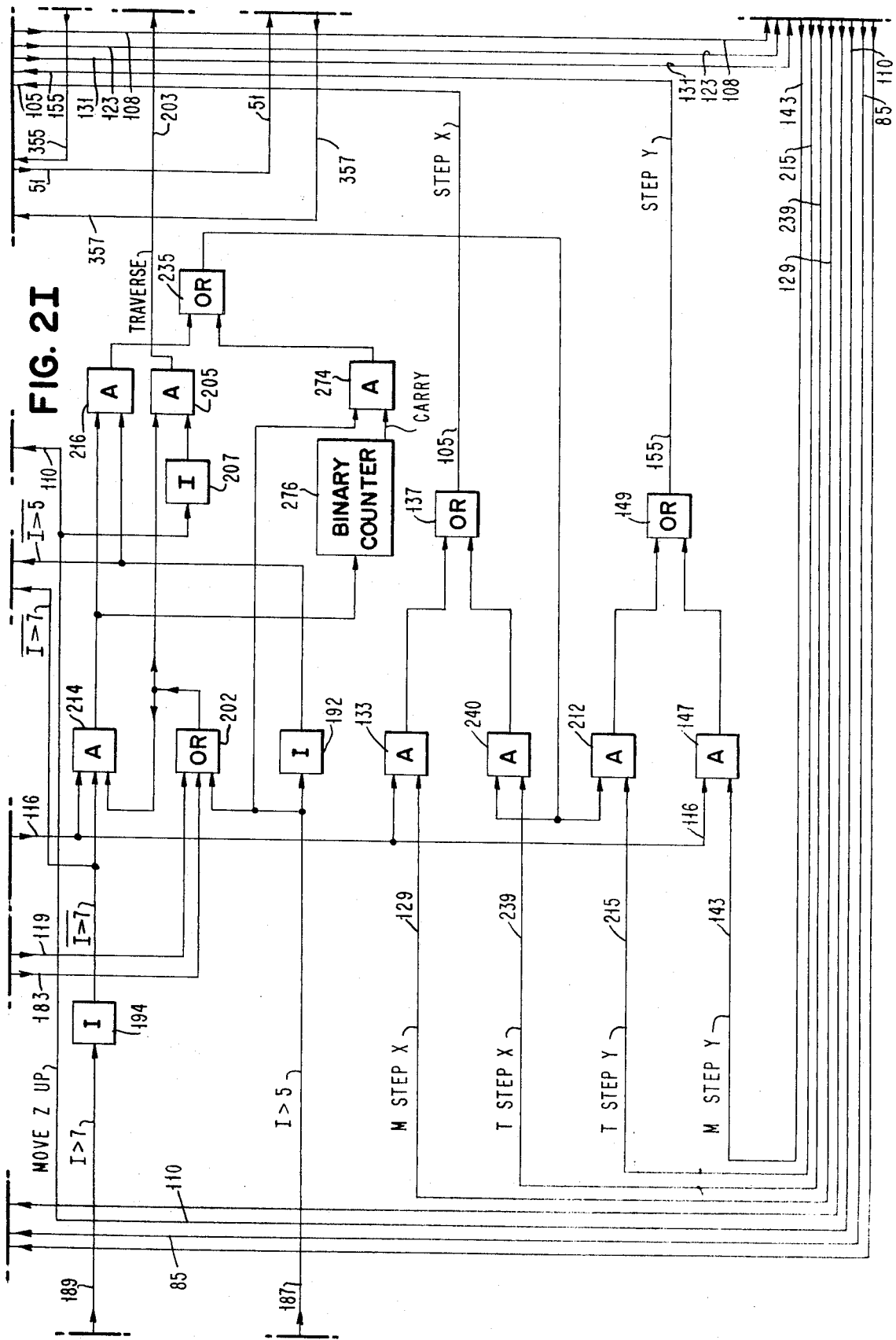

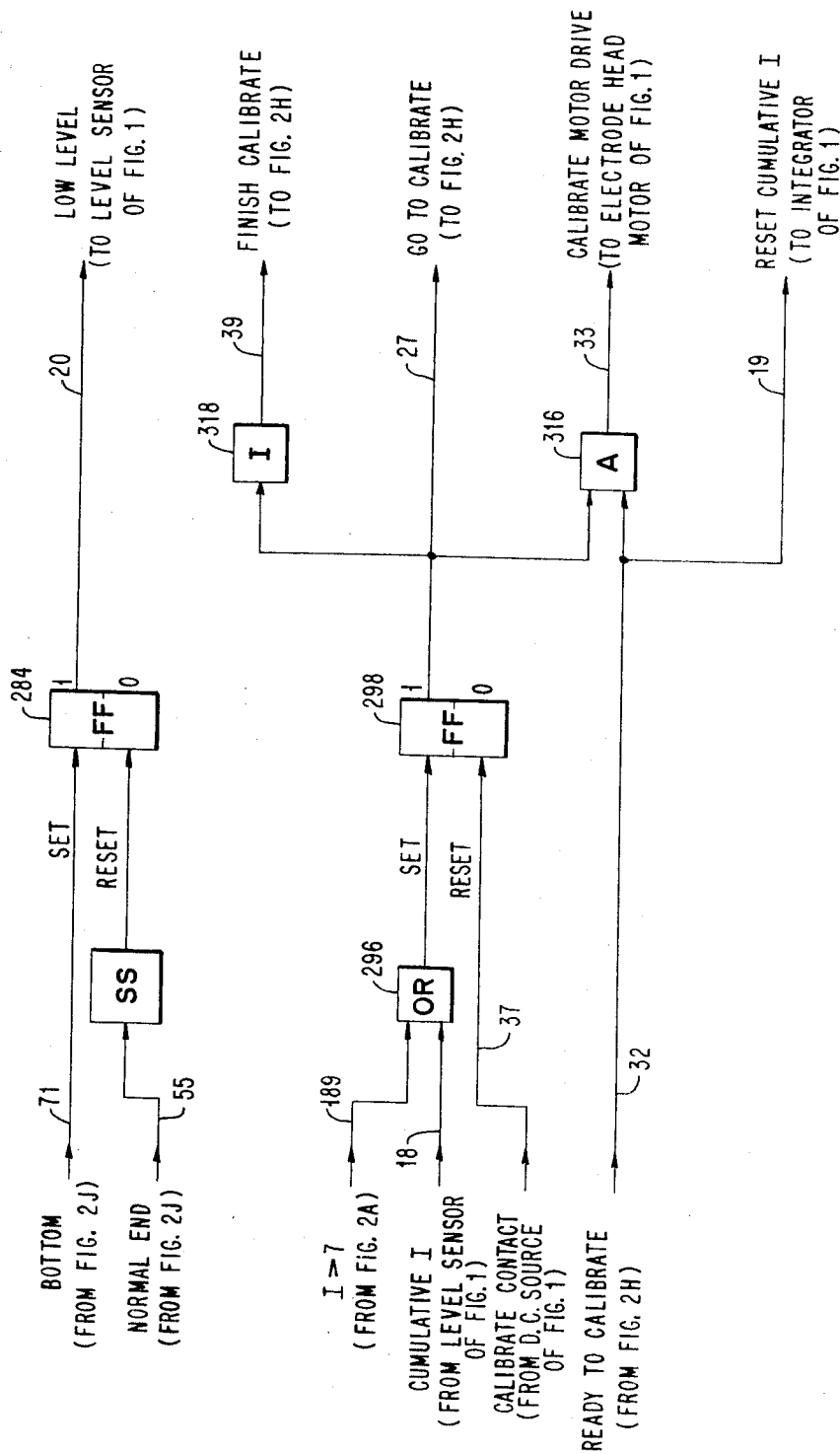
FIG. 3 CALIBRATE SEQUENCE CONTROLLER

X-ORIENTED RASTER PATTERN

Y-ORIENTED RASTER PATTERN

| | |
|---|---|
| 1, OR MORE, SYNC. CHARACTERS | |
| $X_L$- LOWER DATA | |
| $X_U$- UPPER DATA | |
| $Y_L$- LOWER DATA | |
| $Y_U$- UPPER DATA | |
| $Z_L$- LOWER DATA | |
| TRAVERSE DATA | |
| START NEW SHAPE OR RESUME CHAR. | |
| $X_L$- LOWER DATA | |

FIG. 6

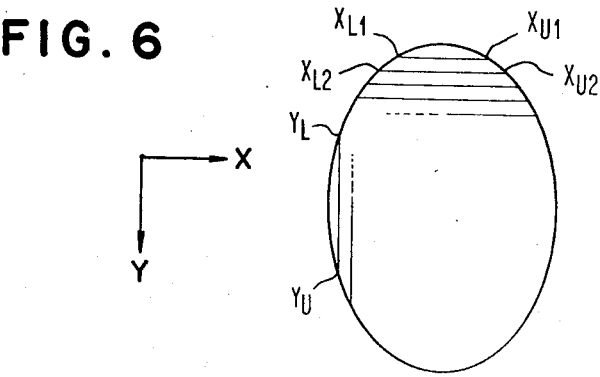

FIG. 7A
STATE TABLE

| CURRENT STATE NUMBER | TYPE LINE | LINE ORIENTATION | LINE DIRECTION | MAJOR LINE REGION | NEXT MINOR LINE DIRECTION | NEXT MAJOR LINE DIRECTION |
|---|---|---|---|---|---|---|
| 1 | MAJOR | X | U TO L | EDGE | | U TO L |
| 2 | MAJOR | X | U TO L | EDGE | | L TO U |
| 3 | MAJOR | X | U TO L | INT. | U TO L | |
| 4 | MAJOR | X | U TO L | INT | L TO U | |
| 5 | MAJOR | X | L TO U | EDGE | | U TO L |
| 6 | MAJOR | X | L TO U | EDGE | | L TO U |
| 7 | MAJOR | X | L TO U | INT | U TO L | |
| 8 | MAJOR | X | L TO U | INT | L TO U | |
| 9 | MAJOR | Y | U TO L | EDGE | | U TO L |
| 10 | MAJOR | Y | U TO L | EDGE | | L TO U |
| 11 | MAJOR | Y | U TO L | INT | U TO L | |
| 12 | MAJOR | Y | U TO L | INT | L TO U | |
| 13 | MAJOR | Y | L TO U | EDGE | | U TO L |
| 14 | MAJOR | Y | L TO U | EDGE | | L TO U |
| 15 | MAJOR | Y | L TO U | INT | U TO L | |
| 16 | MAJOR | Y | L TO U | INT | L TO U | |
| 17 | MINOR | X | U TO L | | | U TO L |
| 18 | MINOR | X | L TO U | | | U TO L |
| 19 | MINOR | Y | U TO L | | | U TO L |
| 20 | MINOR | Y | L TO U | | | U TO L |
| 21 | MINOR | X | U TO L | | | L TO U |
| 22 | MINOR | X | L TO U | | | L TO U |
| 23 | MINOR | Y | U TO L | | | L TO U |
| 24 | MINOR | Y | L TO U | | | L TO U |

| FF (L/S) (FIG.2F) | FF (X/Y) (FIG.2F) | FF (U/L) (FIG.2F) | SS 4 (FIG.2F) | FF (O/E) (FIG.2F) | COMPARE $X_L$ SIGNAL (FIG.2B) | COMPARE $X_U$ SIGNAL (FIG.2B) | COMPARE $Y_L$ SIGNAL (FIG.2C) | COMPARE $Y_U$ SIGNAL (FIG.2C) | NEXT STATE NUMBER |
|---|---|---|---|---|---|---|---|---|---|
| 1 | 1 | 0 | 1 | 1 | 1 | 0 |   |   | 12 |
| 1 | 1 | 0 | 1 | 0 | 1 | 0 |   |   | 16 |
| 1 | 1 | 0 | 0 | 0 | 1 | 0 |   |   | 23 |
| 1 | 1 | 0 | 0 | 1 | 1 | 0 |   |   | 24 |
| 1 | 1 | 1 | 1 | 1 | 0 | 1 |   |   | 11 |
| 1 | 1 | 1 | 1 | 0 | 0 | 1 |   |   | 15 |
| 1 | 1 | 1 | 0 | 0 | 0 | 1 |   |   | 19 |
| 1 | 1 | 1 | 0 | 1 | 0 | 1 |   |   | 20 |
| 1 | 0 | 0 | 1 | 1 |   |   | 1 | 0 | 4 |
| 1 | 0 | 0 | 1 | 0 |   |   | 1 | 0 | 8 |
| 1 | 0 | 0 | 0 | 0 |   |   | 1 | 0 | 21 |
| 1 | 0 | 0 | 0 | 1 |   |   | 1 | 0 | 22 |
| 1 | 0 | 1 | 1 | 1 |   |   | 0 | 1 | 3 |
| 1 | 0 | 1 | 1 | 0 |   |   | 0 | 1 | 7 |
| 1 | 0 | 1 | 0 | 0 |   |   | 0 | 1 | 17 |
| 1 | 0 | 1 | 0 | 1 |   |   | 0 | 1 | 18 |
| 0 | 1 |   | 0 | 0 | 1 | 0 |   |   | 11 |
| 0 | 1 |   | 0 | 1 | 0 | 1 |   |   | 12 |
| 0 | 0 |   | 0 | 0 |   |   | 1 | 0 | 3 |
| 0 | 0 |   | 0 | 1 |   |   | 0 | 1 | 4 |
| 0 | 1 |   | 0 | 0 | 1 | 0 |   |   | 15 |
| 0 | 1 |   | 0 | 1 | 0 | 1 |   |   | 16 |
| 0 | 0 |   | 0 | 0 |   |   | 1 | 0 | 7 |
| 0 | 0 |   | 0 | 1 |   |   | 0 | 1 | 8 |

PATTERN AND CAVITY ELECTROEROSION BY REPEATED RASTER SCANNING

BACKGROUND OF INVENTION

This invention relates to automatic control systems, and more particularly, to numerical control systems for controlling the work element of a machine tool relative to the workpiece.

A significant portion of modern automation relies on the concepts of numerical control of machine tools. The nature of the work to be performed to a large extent determines the type of work element employed and the latter influences the characteristics of the control function. Typically, "point-to-point" control, used for example in jig borers, is primarily concerned with, as the name implies, the ultimate positioning of the work element at specified points rather than the particular path traversed to arrive at these points. "Continuous path" or contour control, on the other hand, requires complex system design to continuously control a prescribed path for the workpiece. Continuous control of a curved path demands the simultaneous control of a pair of independent orthogonal positioning means.

The problem of two-dimensional continuous control is compounded where a need arises to create a cavity of curved contour. Control in the third dimension to create a cavity not only tends to complicate the control circuitry concepts but further imposes significant burdens on the work element such as to rapidly shorten its lifetime of usefulness. Accuracy of the depth of cut, obviously, then, requires frequent renewal of the work element.

SUMMARY OF THE INVENTION

A control system is provided for a multiple axis numerically controlled machine tool. The system may be programmed for multidimensional working of a workpiece with periodic automatic calibration of the work element to compensate for wear.

The present control system confronts the difficult design demands of an automatic cavity carver capable of contour control by providing a relatively simple system which controls each of its independent axis positioning means in separate successive steps. The novel system arrangement according to the present invention operates in either of two modes to produce cavities of either rectangular or nonrectangular contour. As provided by the present invention the work element is always controlled in a rectilinear path.

Operation of the system in the first mode to generate a rectangular cavity employs the control function of the novel system logic wherein the work element is caused to repetitively traverse a raster scan pattern, between the stored X-Y limits, removing additional material during each scan pattern until it arrives at the specified depth. Operation in the second mode to generate a nonrectangular contour cavity causes the work element to scan single lines of varying length under alternate control of the system logic of Position Controller and Sequencer and the stored input data of the input control unit. The single scan lines form a pattern which is repeated at progressively greater depths until the specified depth is reached.

Provision has also been made, in accordance with the present invention, for automatic periodic calibration of the work element during cutting with further provisions to allow more frequent calibration near the specified bottom limit of the cavity, thereby providing increased control and accuracy. Finally, provision has been made to automatically reduce the speed of traverse when the work element approaches a high point, obstruction or irregularity in the work path and to further automatically prevent contact or fusing of the work element with the high point, obstruction or irregularity.

It is therefore the main object of this invention to provide a numerical control system which produces novel three-dimensional control of the work element.

It is a further main object of this invention to provide a numerical control system capable of removing material from a workpiece to form a cavity not constrained in shape to the shape of the material removal work element.

Another object of this invention is to provide a novel logic arrangement to control the movement of the work element to form a raster scan pattern.

A further object of this invention is to provide an automatic metal removal machine with means to automatically recalibrate the metal removal element to compensate for wear.

A still further object of this invention is to provide an automatic numerical control cavity forming machine with a novel arrangement to sense the depth of material removed from said cavity.

An additional object of this invention is to provide a numerical control system for forming cavities of either rectangular or nonrectangular contour.

Yet another object of this invention is to provide an automatic cavity forming machine with means to automatically increase the frequency of calibration near the specified bottom limit of the cavity being formed.

Yet still another object of this invention is to provide a numerical control cavity cutting machine with means to automatically reduce the speed of traverse of the work element as it approaches a high point, obstruction or irregularity in the work path and to further automatically prevent contact of fusing of the work element with the high point, obstruction or irregularity.

These and other objects and advantages according to the present invention are achieved by providing a numerical control system which utilizes a work element which continuously works during rectilinear motion over the surface of the workpiece to create a raster scan pattern according to the system logic and wherein automatic iterative scanning generates a cavity of controllable depth which, according to the mode of operation, may be either rectangular or nonrectangular contour. There is further provided an elongated wire electrode automatically renewed in length in accordance with the amount of wear as determined upon periodic calibration. The energy flow between the electrode and workpiece is used to sense and control the depth of cut and the frequency of calibration. There is thus provided a control system of relatively simple design such as to direct independent electrode movement along distinct rectilinear X-Y paths orthogonal to one another to generate a cavity of controllable shape and size according to the input instructions and which further periodically calibrates and automatically renews the work element to provide a substantial degree of accuracy. Automatic renewal of the work element further eliminates the costly "down time" incident to systems which require manual replacement or renewal of the work element.

The foregoing and other objects, features and advantages of the invention will be apparent from the following more particular description of a preferred embodiment of the invention, as illustrated in the accompanying drawings.

In the drawings:

FIG. 1 is a system block diagram of the preferred embodiment of the present invention.

FIG. 2 designates the manner in which FIGS. 2A through 2J are to be arranged to provide a detailed showing of the Position Controller and Sequencer of FIG. 1.

FIG. 3 is a detailed showing of the Calibrate Sequence Controller of FIG. 1.

FIG. 6 illustrates the contour of a typical nonrectangular contour cavity generated in accordance with the present invention.

Figure 1:
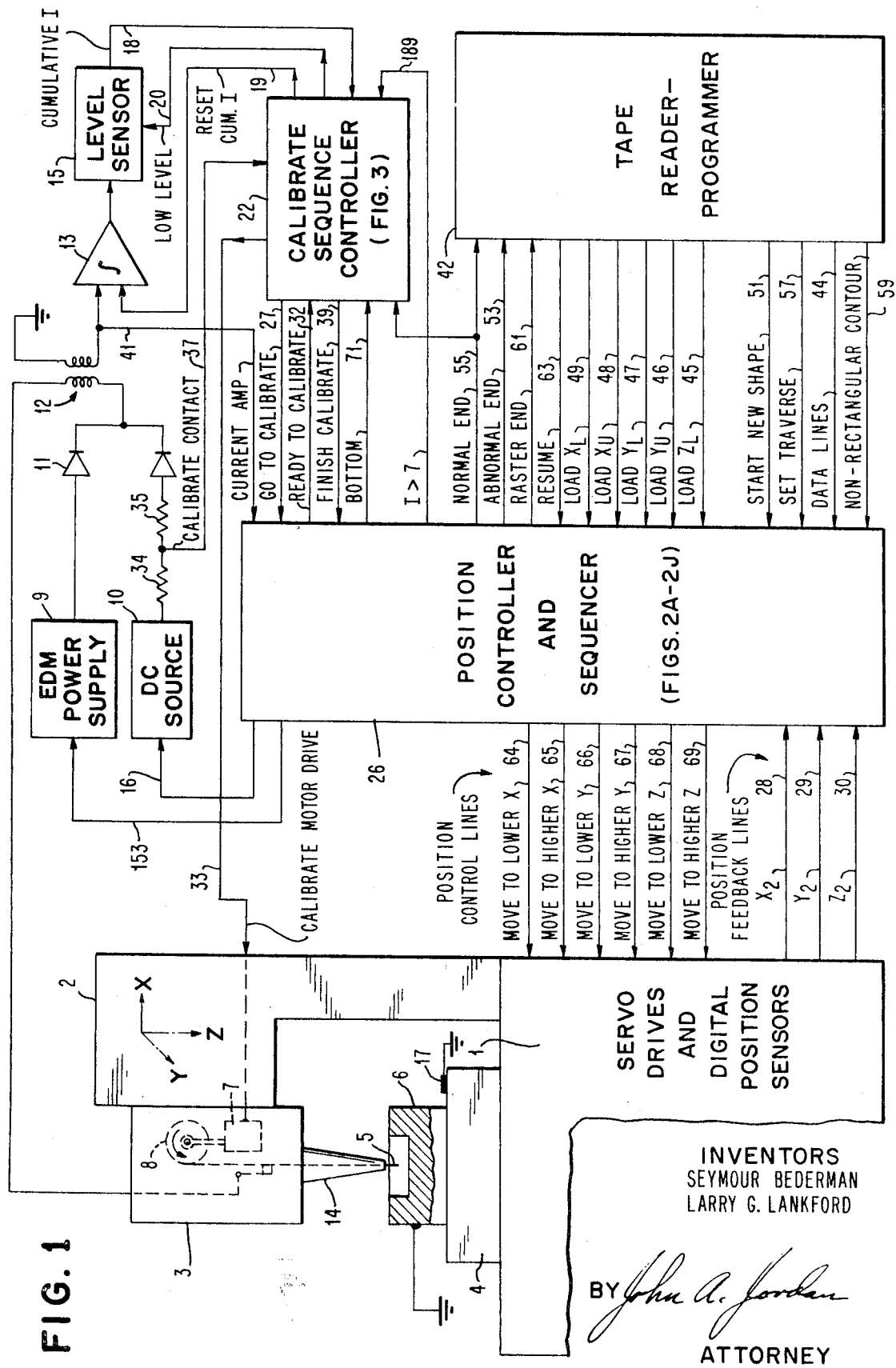
Figure 2:
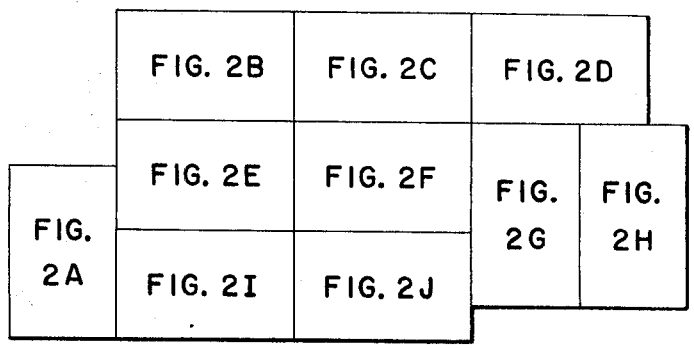
Figure 2A:
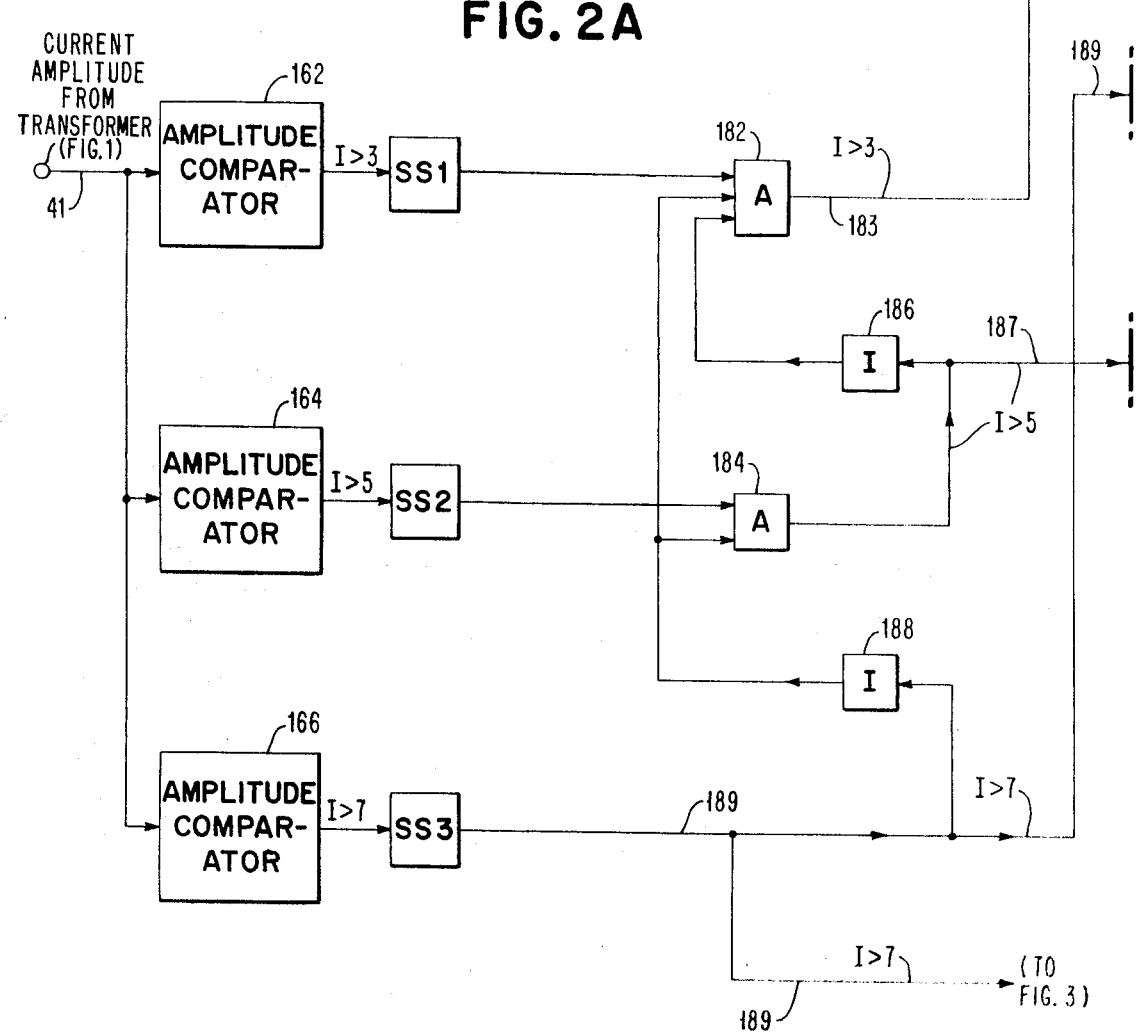
Figure 2C:
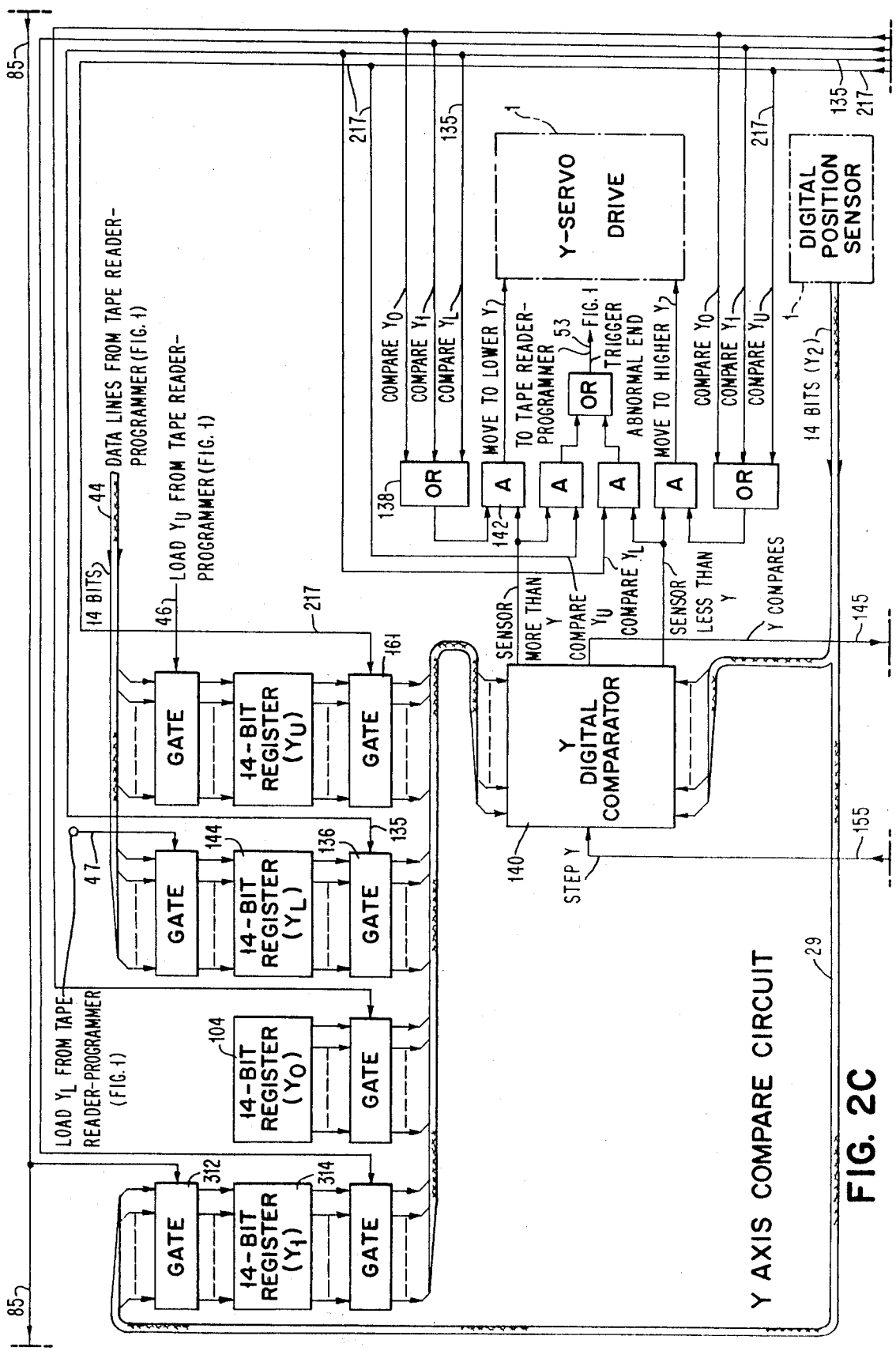
Figure 2F:
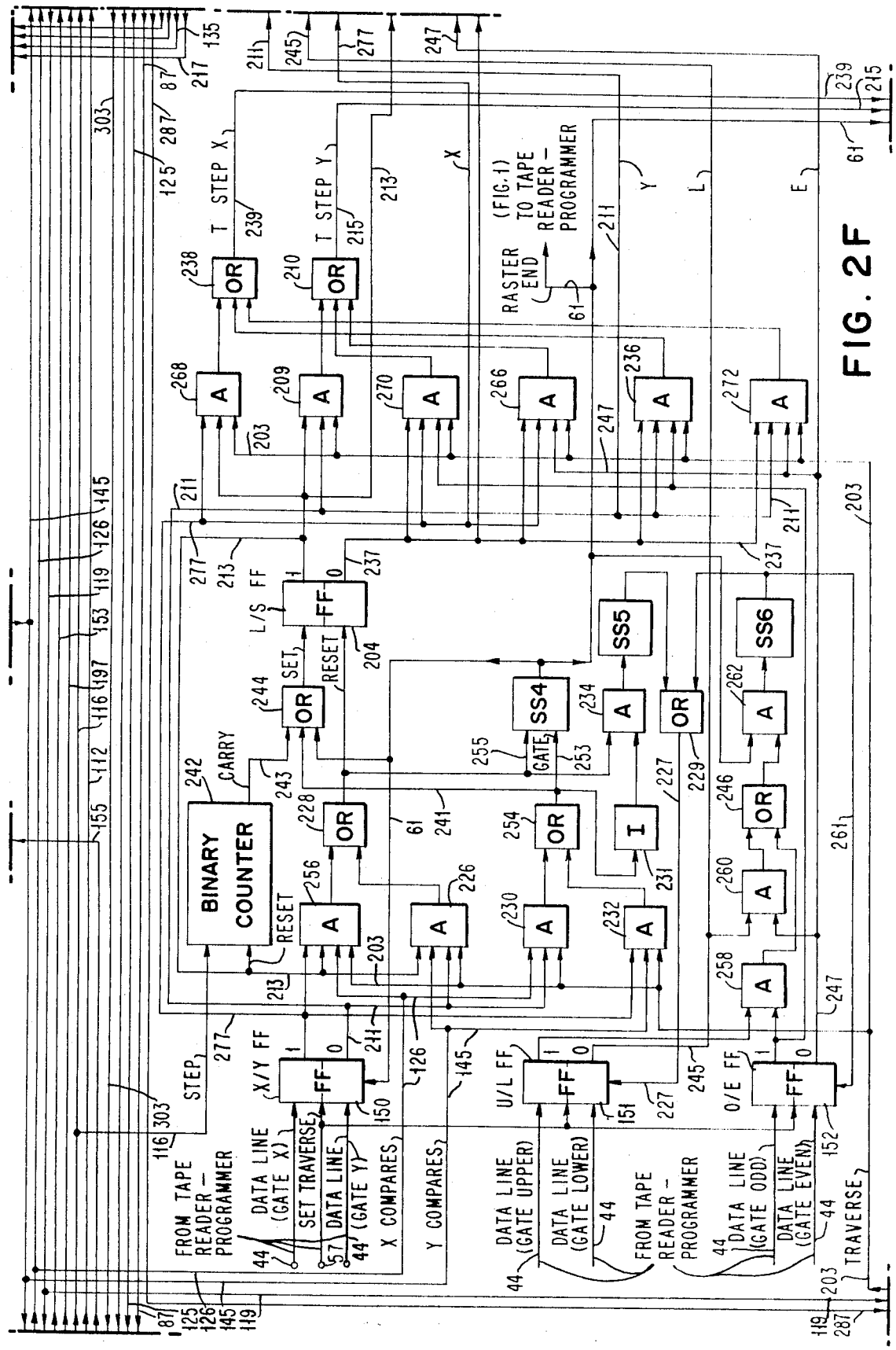
Figures 7, 7B:
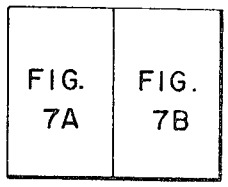

FIG. 7 designates the manner in which FIGS. 7A and 7B are to be arranged to show a state diagram defining the states of the Position Controller and Sequencer of FIG. 1 as determined by the state of the flip-flops of FIG. 2F.

GENERAL DESCRIPTION

FIG. 1 shows a general block diagram of the system according to the present invention. Blocks 1, 2 and 3 comprise a conventional three-axis numerically controlled machine tool. Block 1 contains X-axis, Y-axis and Z-axis position servo drives and digital position sensors of a conventional nature, well known to those skilled in the art. The servo drives may comprise step motors which rotate in increments in accordance with the digital data input while the position sensors generate digital data to provide 14-bit characters indicative of the absolute position of the work element. Block 2, contiguous with block 1, contains the electrode head 3 drive train assembly which is mechanically coupled to the Z-axis servo drive of block 1. For convenience of explanation, direction has been assigned in accordance with the coordinate axis shown in block 2. Electrode head 3 provides electrode movement in the Z-axis direction while worktable 4 imparts motion to workpiece 6 in the X-axis and Y-axis direction. Alternative arrangements, however, could be used.

Work element 5, in the preferred embodiment, is a wire electrode of the type used in electrical discharge machining, known in the art as EDMing. EDMing requires workpiece 6 to be electrically conductive. With reserve wire stored on reel 8 a continuous electrode is provided. Such an electrode has been described in the Nov. 8, 1965 edition of *American Machinist*, Vol. 109, No. 23, entitled "EDMing with a wire." It is to be understood, however, that any work element that continuously functions to remove material during rectilinear motion may be used. Thus, "scan-type" work element, used herein, contemplates any type work element effective to remove material as it is scanned in any direction in the X–Y plane.

Calibrate motor 7, in electrode head 3, periodically rotates reel 8, in response to a calibrate command, to feed wire to renew the electrode to a prescribed length. Power supply 9 provides electrode 5 a 500 kc. discharge signal. Direct current source 10, also coupled to electrode 5, is normally off. As will be explained in more detail, hereinafter, source 10, which may be of the order of a few volts, is used during the calibrate sequence. The 500 kc. EDM signal is rectified by diode 11 and coupled via transformer 12 to integrator 13. Level Sensor device 15, which may be any of a variety of well-known variable level threshold devices, such as a Schmitt trigger or differential amplifier, generates a calibrate command on Cumulative I line 18 in response to the required voltage buildup on integrator 13. Reset Cumulative I line 19 resets the integrator after each calibrate command to thereby initiate another integration cycle. There is thus provided intermittent calibrate sequences wherein work element 5 is removed from operation on the workpiece and positioned over a reference point for calibration.

In accordance with another feature of the present invention, provision is made to increase the rate of the intermittent calibrate sequence. Accordingly, as the work element approaches the bottom level of the cavity, as determined by the stored Z-lower input data, a control signal from Calibrate Sequence Controller 22 is sent, via Low Level line 20, to reduce the trigger level of Level Sensor 15. It can be seen that reduction of the trigger level of Sensor 15 will increase the frequency of the calibrate command signals and therefore the frequency of occurrence of the resultant calibrate sequence to thereby insure greater accuracy in the depth of cut at the bottom of the cavity.

With the receipt of a signal from Level Sensor 15, Calibrate Sequence Controller 22 instructs Position Controller 26, via Go To Calibrate line 27, to position electrode head 3 to a set of stored X- and Y-reference coordinates over a physical reference point of known height. For example, electrode head 3 could be moved to a predetermined stored reference coordinate position adjacent workpiece 6 wherein conductive plate 17 on the top of table 4 would provide a known physical reference point. It is required that the reference point provide a conductive path to ground.

Upon arrival of electrode head 3 at the reference position, as determined by data received on Position Feedback Lines 28, 29 and 30, Position Controller 26 sends a Ready to Calibrate signal over line 32 to Calibrate Sequence Controller 22. Simultaneous therewith the Position Controller turns DC Source 10 on via line 16. In response to the Ready to Calibrate signal the Calibrate Sequence Controller signals motor 7, over Calibrate Motor Drive line 33, to commence feeding the wire electrode in the forward direction, as designated by the arrow on reel 8. When the electrode has been extended to the point where contact is made with plate 17 on the top of table 4 a path is provided to ground for DC Source 10. The resultant voltage change at the midpoint of the voltage divider, made up of resistors 34 and 35, is sensed by Calibrate Sequence Controller 22, over line 37, to provide a Finish Calibrate instruction over line 39 to the Position Controller. The Position Controller then returns the electrode head to its position prior to calibration. It is noted that although, for the sake of simplicity, reference is made to the electrode head moving to a reference point and returning to its initial position, in the embodiment shown positioning in the horizontal plane is in reality accomplished by moving worktable 4, as previously explained.

There is thus provided a calibrate operation wherein electrode 5 is periodically renewed by feeding forward new electrode increments, when the electrode head is in a fixed position, until contact is made with the established reference point. As will be explained in more detail hereinafter the calibrate operation will also be initiated when electrode 5 experiences a predetermined increase in current due to its approach to a high point or obstruction in its path of traverse. The increased current is sensed by transformer 12 and sent to the Position Controller over Current Amplitude line 41.

As embodied, electrode current greater than 7 amps initiates a calibration operation. Where the obstruction is of relatively steep slope there will be frequent calibration as the electrode tends to burn through the obstruction. Where the obstruction is of gradual slope the calibration will not be as frequent and the electrode will tend to burn in a staircase pattern as it partially progresses in increments over the obstruction. Such results can more clearly be understood when it is noted that upon return of the electrode head after calibration, descent terminates and traverse commences upon arrival of the electrode at a distance corresponding to a 3-amp discharge. Such a distance will, obviously, be greater than the distance existing when the 7-amp discharge initiated the calibration operation. There is then provided a safeguard against the damaging effects of the electrode coming into too intimate contact with the workpiece wherein mechanical damage or fusing might occur.

Figure 5:
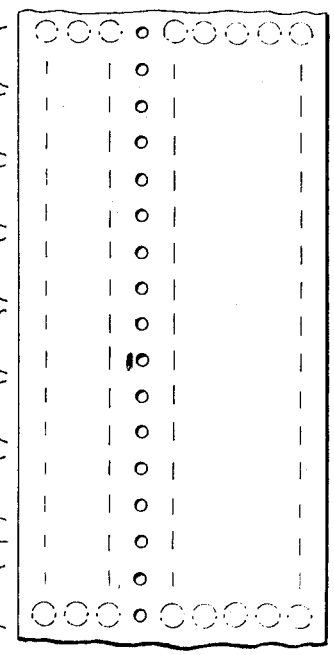
FIG. 5 illustrates a section of punched tape showing a typical format for use by the Tape Reader-Programmer of FIG. 1 to convey input data to the system.

As shown in FIG. 1, Tape Reader-Programmer 42 generates and distributes the numerical data input. It is to be understood, of course, that other appropriate means may be used for presenting numerical data input and these are also contemplated. For purposes of illustration, a punched tape type stored input is shown in FIG. 5. The input data read from the tape is stored in registers in Position Controller and Sequencer 26. For further purposes of illustration, 14-bit binary numbers are used to define the limits or boundaries of electrode cutting. Such numbers are adequate to accurately describe coordinate points, within the range of electrode head 3, to the nearest thousandth of an inch. With the 8-bit tape shown in FIG. 5, two rows are used to define the input data.

RECTANGULAR CAVITY CONTROL

As pointed out hereinbefore the system is capable of operation in either of two modes. In the first mode a rectangular cavity is generated in accordance with the numerical value of the digitally coded coordinate input data provided. As shown in FIG. 4, four sets of coordinates will define the limits in the X-Y plane with $X_L$ designating the lower X-coordinate, $X_U$ the upper X-coordinate, $Y_L$ the lower Y-coordinate and $Y_U$ the upper Y-coordinate. The depth of the cavity is defined by a lower Z-coordinate $Z_L$. The legends shown adjacent the 8-bit tape of FIG. 5 designate a possible format for the input data. The synchronization characters of the first pair of rows of the tape provide a program of instructions for reading the tape into Position Controller 26 in FIG. 1, consistent with the sequence in which the data occurs on the tape. Storage registers are provided in the Tape Reader-Programmer to store the synchronization characters until they are needed to gate the remaining tape data into the position Controller. The digital coordinate data $X_L$, $X_U$, $Y_L$, $Y_U$ and $Z_L$ are sequentially fed into the Position Controller and Sequencer over common Data Lines 44 to the 14-bit registers therein. The five Load lines 45, 46, 47, 48 and 49 of FIG. 1 provide consecutive gating signals, in accordance with the synchronization characters sequentially read from the storage registers of the Tape Reader-Programmer, to gate the coordinate data into the proper register at the time it is being read by Tape Reader 42.

Figure 4A:
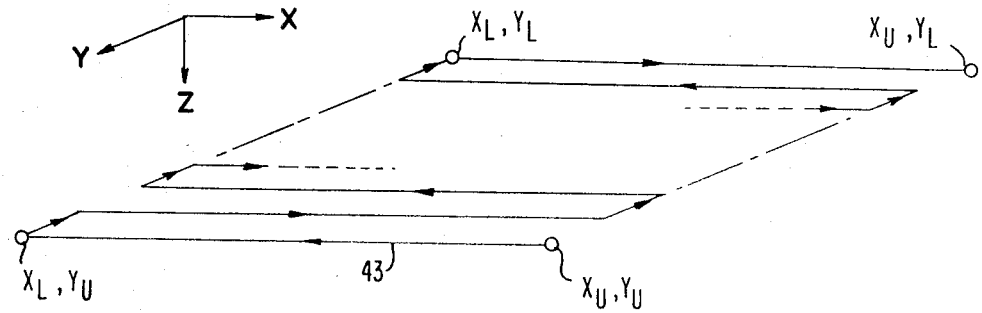
FIGS. 4A and 4B show, respectively, an X-oriented and a Y-oriented raster scan pattern in accordance with the control logic circuitry of the Position Controller and Sequencer of FIG. 1.
Figure 4B:
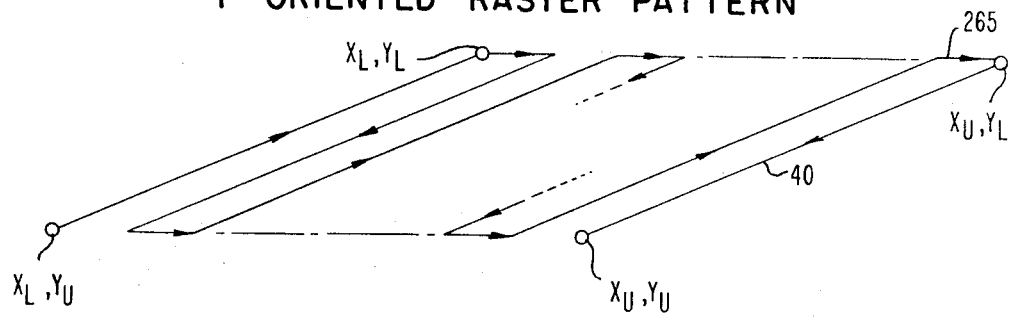

As is evident from FIGS. 4A and 4B, two types of scanning are effected by the Position Controller and Sequencer of FIG. 1. It is to be noted that "raster scan" as used herein includes scanning in both directions such that the work element is operative to and fro across the workpiece. In FIG. 4A the lines scanned in the X-direction are considered the "major" scan lines while the lines scanned in the Y-direction are considered the "minor" scan lines. In FIG. 4B the converse is true. The patterns are alternately used in accordance with Position Controller and Sequencer 26 logic until $Z_L$ is reached. However, as is evident, it is possible to commence scanning using either pattern from any of the four corners of the cavity. The traverse data of the tape of FIG. 5 determines the manner in which scanning will commence. Such data properly sets the three input flip-flops 150, 151 and 152, shown in FIG. 2F, in conformity with the selected one of the above-mentioned possibilities. The data is sent over Data Lines 44 of FIG. 1 and is sequentially gated, in accordance with the tape Sync Character information, over Set Traverse line 57.

After the Tape Reader-Programmer of FIG. 1 has sent all of the instructional data to the Position Controller and Sequencer, rectangular contour cavity generation requires a final instruction. This instruction transfers control of the system from the Tape Reader-Programmer to the Position Controller and Sequencer where it is maintained until the specified cavity is cut or until there is an unscheduled event. The "transfer" instruction is provided by the tape row designated Start New Shape in FIG. 5. Line 51 of FIG. 1 conveys this instruction. An unscheduled event, detected within the Position Controller and Sequencer, returns control to the Tape Reader and Programmer over Abnormal End lines 53 while normal completion of the work specified by the input instructions returns control to the Tape Reader and Programmer over Normal End line 55.

As is evident from the above discussion the rectangular cavity cutting function provided by the present invention requires relatively few input instructions. This is due to the system capability of internally providing itself with logic instructions in accordance with the novel system design.

NONRECTANGULAR CAVITY CONTROL

Generation of a nonrectangular contour cavity, in accordance with the present invention, is obtained by scanning line by line with each line length varying incrementally in accordance with the changing cavity contour. This can more clearly be demonstrated by reference to FIG. 6. To generate a cavity, elliptical in the X-Y plane, it is necessary for the system to first scan the short line between $X_{U1}$ and $X_{L1}$ and return control of the system to the Tape Reader-Programmer. The tape of the Tape Reader-Programmer then provides the Position Controller and Sequencer, in digital form, the next set of coordinates defining $X_{U2}$ and $X_{L2}$. Control, then, continuously alternates between the Position Controller and Sequencer as elliptically varying digital coordinates are fed to the system by the data input tape. It is clear that after one complete pattern of line-by-line X-direction scanning in the X-Y plane a second X-direction scan pattern, interlaced with the first, could then be used. It is also clear that input data could be provided to initiate scanning in the Y-direction using the same technique.

As is evident, system operation in the second mode requires equality in certain of the coordinate input data. To scan in the X-direction requires that $Y_L=Y_U$ and to scan in the Y-direction requires $X_L=X_U$. By equating one of the sets of coordinates a Raster End signal is caused to be generated after each line of scan. Operation in the second mode also requires traverse data as in Rectangular Control. As in previous cases the instructional data is gated to the Position Controller and Sequencer in accordance with the synchronization characters of the tape shown in FIG. 5. In addition the Tape Reader-Programmer provides a DC level signal, over Nonrectangular Contour line 59, to the Position Controller and Sequencer to thus provide a Nonrectangular Contour instruction.

With reference to FIG. 5, then, in the Nonrectangular Contour mode the numerical value of the coordinate input data will be the same for either X-lower and X-upper or Y-lower and Y-upper. Additionally, a Nonrectangular Contour instruction will be provided and a Start New Shape signal will be given to initiate the first scan. At the end of the first scan a Raster End signal is sent over line 61 of FIG. 1 to return control to the Tape Reader-Programmer 42. Now a new set of coordinates is read from the tape into the Position Controller and Sequencer. The last row shown in the tape illustrated in FIG. 5 indicates the beginning of a new set of coordinates. After the new set of coordinates is read into the Position Controller and Sequencer a Resume instruction is sent over Resume line 63 in FIG. 1. For each new scan line the tape generates a new set of coordinates. It should be recognized, however, that in such applications it might be more economical to generate the Nonrectangular Contour date by a digital computer.

It should also be recognized that the use of the term "cavity" herein also contemplates material removal to form other than a cavity. For example, material could be removed around the outer portion of a workpiece to thereby form, instead of a cavity, a protrusion in the central portion thereof.

DETAILED DESCRIPTION

A detailed description of the invention will now be given with main emphasis on the manner in which the system is controlled by the Position Controller and Sequencer and the Calibrate Sequence Controller of FIG. 1.

POSITION CONTROLLER AND SEQUENCER

FIGS. 2A through 2J show the detailed logic circuitry of the Position Controller and Sequencer in accordance with the present invention. FIG. 2 demonstrates the manner in which FIGS. 2A through 2J are to be arranged. Description of the Position Controller and Sequencer will center around rectangular contour cavity operation. Such operation is inclusive of the concepts involved in nonrectangular contour cavity operation.

FIGS. 2B, 2C and 2D each show, respectively, the coordinate storage registers and the digital comparator circuits for the X-, Y- and Z-axes. FIGS. 2B and 2C are completely analogous and therefore it will suffice to merely describe the operation of the X-axis circuit of FIG. 2B.

Figure 2G:
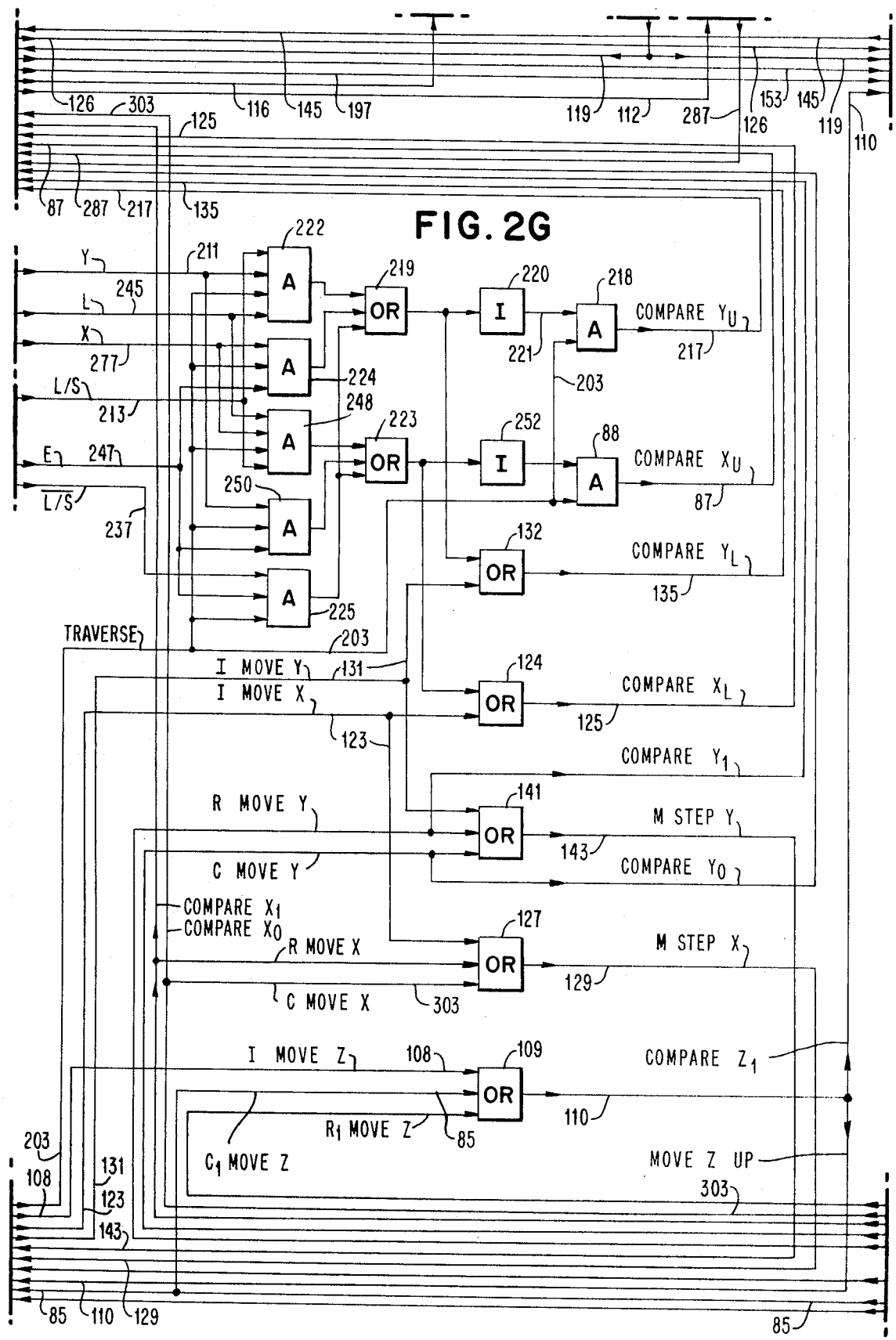

The lower and upper X-axis coordinates are received over Data lines 44 eminating from Tape Reader-Programmer 42 of FIG. 1 and are gated through Gates 79 and 78 into registers 76 and 77, respectively. The Load $X_L$ and Load $X_U$ signals received, respectively, on lines 49 and 48 from the Tape Reader-Programmer of FIG. 1 provide the gating signals. The 14-Bit Register 75 permanently stores the X-axis reference coordinate used in positioning the electrode head during the calibrate sequence. The 14-Bit Register 74 stores the current X-axis digital coordinate position in response to a signal received over line 85 upon initiation of the calibrate sequence. Gates 81, 82, 83 and 84 respond to an appropriate compare instruction originating from FIGS. 2G and 2H. For example, during traverse of the electrode head from an $X_L$ position to an $X_U$ position, line 87, shown in FIG. 2G, will provide an "up" level Compare $X_U$ signal instruction from AND gate 88 in FIG. 2G to gate 81 of FIG. 2B. The Compare $X_U$ instruction originating from AND gate 88 in FIG. 2G is also conveyed, over line 87, to OR gate 89 and AND gate 90 in FIG. 2B. When Digital Comparator 94 in FIG. 2B determines that the current digital position coordinate of the electrode head is less than the target $X_U$ digital coordinate stored in 14-Bit Register 77, a Sensor Less Than X signal is sent out over line 91 to AND gate 92. There is thus provided an AND condition for AND gate 92. The output line 106 of AND gate 92 in turn provides a Move To Higher X signal to the X servo drive.

If for some reason during the traverse of the electrode head from an $X_L$ to an $X_U$ position, the X Digital Comparator determines that the current position of the electrode head is beyond the $X_U$ position, a fault is clearly present. Under such circumstances, the system is designed to generate an Abnormal End signal on line 53 from OR gate 98 which signal functions to return control to the Tape Reader-Programmer. There are two input conditions to AND gate 90 necessary to effect this function. These AND input conditions are receipt of a Sensor More Than X signal on line 93 during the time a Compare $X_U$ signal is received on line 87, from FIG. 2G. The converse function also occurs, via AND gate 92, when the electrode head is traversing from an $X_U$ to an $X_L$ position and a Sensor Less Than X signal is received on line 91 from X Digital Comparator circuit 94. There is thus provided a built-in system function for returning control from the Position Controller and Sequencer to the Tape Reader-Programmer in the event of such abnormal conditions.

The 14-Bit Registers 100 and 101 in FIG. 2D permanently store digital data used during the Calibrate sequence. The 14-Bit Register 100 is stored with zero value digital data to define the uppermost position to which the head will raise during the Calibrate sequence. This position is designated the $Z_1$ position. After the electrode head raises to the $Z_1$ coordinate position during the Calibrate sequence, it then traverses first to the $X_0$ reference coordinate position stored in the 14-Bit Register 75 of FIG. 2B and then to the $Y_0$ reference coordinate position stored in the 14-Bit Register 104 of FIG. 2C. From that point the electrode head descends to the $Z_0$ reference coordinate stored in 14-Bit Register 101.

As will be explained more fully hereinafter, the X-, Y- and Z-Compare circuits are primarily under the control of the circuitry shown in FIGS. 2E, 2F, 2G and 2I. As is evident from inspection of the Compare circuits, initiation of a Compare function requires two signal instructions. For example, in FIG. 2B, a signal is required over line 105 to provide a Step X instruction to the Digital Comparator 94. In addition it is necessary that a particular Compare instruction be received over one of the Compare Lines. The Compare instruction acts to gate the information in the appropriate register to the X Digital Comparator 94 where it is compared with changing values of the X-axis digital position sensor output. The Compare instruction also acts to enable the appropriate OR and AND circuits in the output path of the Digital Comparator.

There are three possible outputs to be received from the X Digital Comparator circuit. If the digital position data of the electrode head compares with the digital coordinate data stored in the register under comparison, then an X Compares signal is sent back to the control circuitry of FIGS. 2E, 2F, and 2H via line 126. Conversely, if this data does not compare, no instruction is sent back to the control circuitry but rather a signal instruction is sent to the servo drive to move the electrode head in the proper direction. For example, when the digital position of the electrode head is less than the stored digital coordinate position under compare, a Sensor Less Than X signal is generated by X Digital Comparator 94 to move the electrode head to a higher value of X. The converse is also true.

Before a detailed description is entered into it should be explained that for purposes of clarity, the various digital input and output lines of the components of FIGS. 2 and 3 have been legended in accordance with the system instruction the particular component is either receiving or sending. It should be noted that in some instances a single output line diverges to two or more components to provide two or more instructions and in those instances legends have been provided beyond the diverging nodal point consistent with the instructions to be performed. It should also be noted that in accordance with the convention used herein the flip-flop states are defined in terms of the "set" and "reset" states with a "1," as shown in the various flip-flops of FIG. 2, designating an "up" level condition on the "set" output and a "0" designating a "down" level condition on the "reset" state output when the flip-flop is in the "-set" state.

INITIATE OPERATION

The circuitry shown in FIG. 2E initiates and sequences system functions, after Tape Reader-Programmer 42 of FIG. 1 releases control by a Start New Shape instruction on line 51. The Start New Shape Signal "sets" flip-flop 107 in FIG. 2E and "resets" flip-flop 348 in FIG. 2J. The output of flip-flop 107 enables OR gate 354 in FIG. 2E. Output line 108 of OR gate 354 then provides OR gate 109 in FIG. 2G an "up" signal level representing an "Initial Move" instruction and designated I Move Z in FIGS. 2E and 2G. Output line 110 of OR gate 109 then conducts a Move Z Up signal to AND gate 111 in FIG. 2E and a Compare $Z_1$ signal to Gate 102 in FIG. 2D. Since Oscillator 113 in FIG. 2E provides a fixed rate input pulse to the second input of AND gate 111 the latter gates the Move Z Up signal to provide a fixed pulse rate Step Z Up signal over line 112 to AND gate 114 in FIG. 2D. Oscillator 113 also provides an enabling pulse train to Z Digital Comparator 115 in FIG. 2D. It can be seen that while the X and Y Digital Comparators of FIGS. 2B and 2C are selectively enabled by either a Step X or Step Y signal, in accordance with whether the instruction is to traverse the X or the Y direction, the Z Digital Comparator of FIG. 2D is always enabled.

With Z Digital Comparator 115 and gate 102 in FIG. 2D both enabled, the zero digital coordinate value stored in the $Z_1$ Register 100 is then compared with the current digital coordinate value, $Z_a$ of the electrode head. Assuming the current position of the electrode head to be below its uppermost limit, as defined by the zero's in the $Z_1$ Register 100, a Sensor Less Than Z signal is generated on output line 117 of the Z Digital Comparator 115. OR gate 118 then provides the "ANDing" input signal necessary for AND gate 114 to produce a Move To Higher Z signal, over line 69, to the Z Servo Drive of FIG. 1.

Electrode head 3 of FIG. 1 then moves to its uppermost position. At this position a Z Compares signal is sent from output line 119 of the Z Digital Comparator 115 to AND gate 120 in FIG. 2E. Delay device 121 in FIG. 2E provides a delay duration somewhat in excess of the Start New Shape pulse duration received on line 51. Thus, by the time the leading edge of the Start New Shape pulse appears at the Delay device 121 output its trailing edge will have been completed at the set input of flip-flop 107. This insures that the setting of flip-flop 122 by gate 120 will work to reset flip-flop 107.

The setting of flip-flop 122 provides an I Move X signal, via line 123, to OR gates 124 and 127 in FIG. 2G to initiate a Compare $X_L$ sequence to move the electrode head to the lower X coordinate position. As will be seen, OR gates 124 and 127 concurrently send signals to the X-Axis Compare Circuit of FIG. 2B. OR gate 124 sends a Compare $X_L$ signal over its output line 125 to both OR gate 96 and gate 82 in FIG. 2B. OR gate 127 sends an M Step X signal, via line 129, to AND gate 133 in FIG. 2I. The pulse oscillator 113 in FIG. 2E repetitively "AND's" the M Step X signal through AND gate 133 to OR gate 137. OR gate 137, in turn, sends a pulsed Step X signal over its output line 105 to X Digital Comparator 94 in FIG. 2B. The X Digital Comparator 94 then provides a Sensor More Than X signal over output line 93 to AND gate 97 to move the X-Servo Drive to its target position as defined by the coordinate address in the $X_L$ Register 76.

When the X-coordinate position of the electrode head, as determined by the Digital Position Sensor of FIG. 1, compares with the $X_L$ coordinates, X Digital Comparator 94 sends, via its output line 126, an X Compares signal back to AND gate 128 in FIG. 2E. AND gate 128 sets flip-flop 130 to initiate a Compare $Y_L$ sequence via I Move Y line 131 and OR gates 132 and 141 in FIG. 2G. Flip-flop 130 Resets flip-flop 122 with Delay device 134 performing a function similar to that of Delay device 121. Accordingly, the delay interval of delay device 134 is somewhat in excess of the duration of one Oscillator 113 clocking pulse. The Compare $Y_L$ signal from output line 135 of OR gate 132 in FIG. 2G is sent to both gate 136 and OR gate 138 in FIG. 2C. OR gate 141 in FIG. 2G sends an M Step Y signal, via line 143, to AND gate 147 in FIG. 2I. OR gate 149 responds to AND gate 147 to convey a Step Y signal, over line 155, to Y Digital Comparator 140 in FIG. 2C. In the same manner described as pertains to the $X_L$ compare sequence, the Y Digital Comparator 140 sends a Move To Lower Y signal to the Y-Servo Drive, via AND gate 142, until the Y position of the electrode head compares with the $Y_L$ target address in $Y_L$ Register 144.

Upon comparison, Y Digital Comparator 140 sends a Y Compares signal, over line 145, to AND gate 146 in FIG. 2E. AND gate 146 sets flip-flop 156 via OR gate 148. The "set" output of flip-flop 156 "resets" flip-flop 130. Delay device 158 functions in the same manner as previously described Delay device 134. The "set" output of flip-flop 156, along with the "reset" output received on line 357 from flip-flop 348 in FIG. 2J, act to enable AND gate 356, in FIG. 2E. Output line 153 of enabled AND gate 356 provides an ON signal to turn on EDM Power Supply 9 in FIG. 1, a Compare $Z_L$ signal for Gate 154 in FIG. 2D and finally an "AND" signal for AND gate 160 in FIG. 2E. Although the EDM Power Supply of FIG. 1 is "on" no electrical discharge as yet occurs since the electrode head is in its uppermost position, i.e., $Z_z=0$.

In the absence of electrical discharge, transformer 12 of FIG. 1 fails to provide current, by way of line 41, to Amplitude Comparators 162, 164 and 166, in FIG. 2A. With no current input to these Comparators there is, obviously, no I>3, I>5 or I>7 pulse signal indication on any of the respective output lines 183, 187 and 189. Line 183 is, however, coupled to Inverter 190 in FIG. 2E and lines 187 and 189 are respectively coupled to Inverters 192 and 194 in FIG. 2I. These Inverters thus provide an "up" signal level condition to the three inputs of AND gate 168, in FIG. 2E. The latter in turn produces an output for one of the four inputs of AND gate 160. Since there is no longer a Z Compares signal on line 119, Inverter 196 in FIG. 2E provides another input condition to AND gate 160. Oscillator 113 provides the third input condition to AND gate 160, via line 116, and, as heretofore mentioned, the enabled state of AND gate 356 provides the final condition. In response to these conditions AND gate 160 produces, via OR gate 198 and line 197, a Step Z Down signal for AND gate 200 in the Z axis compare circuit of FIG. 2D.

To summarize, at this point, it can be seen that the electrode head is in its uppermost position corresponding to a Z Digital Position Sensor output of $Z_z=0$. Also, in the Z Axis Compare Circuit of FIG. 2D, gate 154 is enabled, Z Digital Comparator 115 is, as always, enabled by oscillator 113 in FIG. 2E, and finally AND gate 200 is in receipt of a Step Z Down signal. The comparison that is now made results in a Sensor More Than Z signal being generated on output line 207 of the Z Digital Comparator which in turn causes AND gate 200 to provide a Move to Lower Z signal for the Z-Servo Drive 1. The electrode head, in consequence, descends until the electrode is sufficiently close to the workpiece to create an electric discharge greater than 3 amps. As previously suggested this latter condition is determined by providing a current path 41 between transformer 12, shown in FIG. 1, and Amplitude Comparator 162 in FIG. 2A. This allows the current passing through electrode 5 in FIG. 1 to be sensed by Comparator 162. When the current in transformer 12 reaches an excess of 3 amps., Comparator 162 triggers single shot SS1 and the output of the latter provides an input to AND gate 182. At this point in time the electrode has not reached sufficient closeness to the workpiece to cause generation of an I>5 or an I>7 signal indication on line 187 and 189, respectively. These "no signal" conditions are inverted by Inverters 186 and 188 to enable AND gate 182. The "up" signal level on the AND gate 182 output terminates, via Inverter 190 in FIG. 2E, the "ANDing" of AND gates 168 and 160. In response thereto OR gate 198 ceases to provide a Step Z Down signal on line 197.

As can be seen electrode head descent is terminated before the electrode is sufficiently close to the workpiece to generate a current greater than 5 amps. It is to be noted, however, that the periodic calibration operation effected during the course of eroding a cavity also involves descent of the electrode and the simultaneous sensing of current therethrough. Under these circumstances when calibration occurs near the bottom limit $Z_L$, it is possible that a Z Compares signal will be generated before an I>3 signal. Such a signal would be received on line 119 in FIG. 2E and inverted by Inverter 196 to terminate "ANDing" in AND gate 160. Again, OR gate 198 would cease to provide a Step Z Down signal on line 197. As can be seen two conditions are therefore possible to terminate electrode head descent. Looking at FIG. 2I it can be seen that either one or the other of these latter conditions is sensed by OR gate 202 to produce a Traverse instruction on line 203 to initiate the traverse scan operation.

RASTER SCAN

FIG. 2F shows the main components of the raster scan system logic according to the present invention. The 24 defined raster states, as shown in FIG. 7A, are established in accordance with the individual states of flip-flops 150, 151, 152 and 204 and single shot SS4. As provided by the raster scan system logic, the "set" and "reset" state of X/Y flip-flop 150 determine the "major" and "minor" line orientation of the raster pattern of FIG. 4. When flip-flop 150 is in the "set" state the "major" lines of scan are X-oriented as shown in FIG. 4A and when flip-flop 150 is in the "reset" state the "major" lines of scan are Y-orineted as shown in FIG. 4B. The initial state of flip-flop 150, as well as the initial states of flip-flops 151 and 152, are set in accordance with the input data received over the respective Data Lines 44 of FIG. 1 when Set Traverse line 57 is enabled. As can be seen, when flip-flop 150 receives both a Gate X signal over its respective Data Line and a Set Traverse signal over the Set Traverse line the "set" state is thus effected to thereby provide an X-oriented raster scan.

The state of U/L flip-flop 151 determines the direction of electrode head movement along a "major" line of scan. For example, with flip-flops 150 and 151 both in the "set" state the "major" lines of scan are X-oriented and the electrode head is moving in the direction of increasing coordinate values, i.e., from $X_L$ to $X_U$. Conversely, if U/L flip-flop 151 is in the "reset" state with X/Y flip-flop 150 still "set" the "major" lines of scan are still X-oriented but the electrode head is moving in the direction of decreasing coordinate values, i.e., from $X_U$ to $X_L$. Likewise the state of O/E (Odd/Even) flip-flop 152 determines the direction of electrode head movement along the "minor" lines of the raster scan pattern. The "set" state of O/E flip-flop 152 causes movement of the electrode head to be in the direction of increasing coordinate values and the "reset" state causes the converse. L/S (Long/Short) flip-flop 204 determines whether the electrode head is moving along a "major" raster scan line or a "minor" raster scan line.

When this flip-flop is in the "set" state movement is along a "major" line and conversely when it is in the "reset" state movement is along a "minor" line. Finally, single shot SS4 determines whether the "major" line being traversed is an "interior" or "edge" line.

The necessity of distinguishing these latter two states is apparent when it is recognized that although an "interior-major" line of traverse is always followed by a "minor" line of traverse, in accordance with the state of flip-flop 204, an "edge-major" line of traverse is followed by another "major" line of traverse upon change in "major" line raster scan orientation. This can be seen in FIG. 4 wherein an "edge-major" scan line 40 in the Y-oriented raster pattern of FIG. 4B leads to an "edge-major" scan line 43 in X-oriented raster pattern in FIG. 4A. Thus the five binary devices X/Y flip-flop 150, U/L flip-flop 151, O/E flip-flop 152, L/S flip-flop 204 and single shot SS4 define the 24 states utilized to effect the raster scan logic of the present invention. This is more clearly illustrated by the State Table of FIG. 7 wherein the raster scan logic states are defined in FIG. 7A and the corresponding states of both the binary devices and the compare signal instructions are shown in FIG. 7B.

Operation of the raster scan system logic of FIG. 2F will now be described. Assuming the initial conditions wherein X/Y flip-flop 150 is in the "reset" state, U/L flip-flop 151, O/E flip-flop 152 and L/S flip-flop 204 are all in the "set" state and OR gate 202 in FIG. 2I initiates a Traverse signal after the initial descent of the electrode head to the workpiece, as hereinbefore described, then, the raster logic is in state 16 as defined by FIG. 7. Under these conditions the X/Y flip-flop 150 "reset" output line 211, the L/S flip-flop 204 "set" output line 213 and the traverse line 203 are all in the "up" signal level and AND gate 209 is thereby enabled. The "up" signal level output of AND gate 209 is coupled to one of the inputs of OR gate 210 wherein the latter is enabled to provide a T Step Y signal, over line 215, to AND gate 212 in FIG. 2I.

Since electrode head descent was terminated prior to the generation of an I>5 or I>7 signal indication, as previously explained, Inverter 194, in FIG. 2I, provides an "ANDing" input to AND gate 214. The periodic pulse output of oscillator 113 and the "up" signal level of the output of OR gate 202 provide the other two inputs necessary to enable AND gate 214. The periodic pulse output of AND gate 214 and the "up" level output of Inverter 192 provide a periodic enabling of AND gate 216. OR gate 235 couples the periodic pulse output of AND gate 216 to AND gate 212. AND gate 212 is thereby periodically enabled, in synchronization with Oscillator 113, to provide a pulsed Step Y signal to the Y Digital Comparator 140 of FIG. 2C. At the same time AND gate 218 in FIG. 2G delivers a Compare $Y_U$ instruction, over line 217, to gate 161 of the Y Axis Compare Circuit of FIG. 2C. The enabling of AND gate 218 is effected through the presence of both a Traverse signal on line 203 and the inverted absence of any complete "AND" input conditions to AND gates 222, 224 and 225, provided on Inverter 220, output line 221. AND gates 222, 224 and 225 each fail to provide an "AND" input condition to inverter 220 due to the fact that "up" signal levels are only present on Y input line 211, L/S line 213 and Traverse input line 203.

In the same manner as explained previously the Compare $Y_U$ and the Step Y signal instructions sent to the Y Axis Compare circuit of FIG. 2C effect a compare function to move the electrode head to the target position. Here, the target position is the $Y_U$ coordinate. As provided by the initial conditions assumed, then, the electrode head is being directed to move along a Y-oriented "major" scan line in the direction of increasing coordinate values with conditions existing to next direct the electrode head to a "minor" scan line in the direction of increasing X-coordinate values, after the $Y_U$ target position has been reached.

When the coordinate position $Y_2$ of the electrode head corresponds to the $Y_U$ coordinate, so that $Y_2=Y_U$, Y Digital Comparator 140 produces an "up" level Y Compare signal on line 145. The Y Compare signal is sent to AND gate 226 in FIG. 2F. With flip-flop 204 in the "set" state, flip-flop 150 in the "reset" and both a Traverse and Y Compare signal present AND gate 226 is enabled to provide an "up" signal level to the input of OR gate 228. The output of OR gate 228 "resets" flip-flop 204. Neither AND gate 230 nor AND gate 232 are, at this time, enabled and therefore Inverter 231 provides an "up" signal to one of the two inputs of AND gate 234. OR gate 228 provides the other "up" signal input necessary to enable AND gate 234. The enabling of AND gate 234 triggers single shot SS5. The pulse generated by single shot SS5 passes through Or gate 229 to the complementary input 227 of flip-flop 151. As is well known to those skilled in the art a pulse on the complementary input is effective to unconditionally change the state of the flip-flop. Flip-flop 151, then, is pulsed into its "reset" state. With flip-flop 204 and flip-flop 151 both changed to the "reset" state the raster scan logic state changes to State 18 defined in FIG. 7.

The resetting of flip-flop 204 causes its "set" output line 213 to go to its "down" level resulting in the loss of the "AND" condition at AND gate 209. The loss of this "AND" condition terminates the T Step Y signal on line 215 causing it to go to its "down" level. The "down" level on line 215 terminates the pulsed Step Y signal in FIG. 2I. The resetting of flip-flop 204 also works to enable AND gate 236 over its "reset" output line 237. The enabling of AND gate 236 initiates a T Step X signal on line 239 through OR gate 238. The "up" level of the T Step X signal is fed to AND gate 240 in FIG. 2I. The output of OR gate 235 which produces pulses in synchronization with Oscillator 113 in a manner previously described, is likewise fed to AND gate 240. In response thereto AND gate 240 is enabled, in synchronization with Oscillator 113, to provide a periodic pulse Step X output signal on line 105. This Step X pulse signal enables X Digital Comparator 94 in FIG. 2B.

The electrode head is now directed along a "minor" line in the direction of increasing X coordinate values. At the same time, the resetting of flip-flop 204 also removes the "up" level from the "reset" input 213 of 16-bit Binary Counter 242 in Fig. 2F. The counter is then allowed to count pulses, received on line 116, from Oscillator 113 in FIG. 2E. It can be seen that the Step X pulses, in synchronization with Oscillator 113 pulses, commence simultaneously with the enabling of Counter 242. Counter 242, then, effectively, counts 16 of the pulses directing "minor" line movement in the X-direction and, then, "sets" flip-flop 204 via Carry output line 243 and OR gate 244. The "set" output of flip-flop 204, then, "resets" Counter 242.

With flip-flop 204 thus "set" the raster scan logic changes to State 12 defined in FIG. 7A. Under these conditions AND gate 209 is again enabled allowing the T Step Y line to go to an "up" level thus permitting Step Y pulses from OR gate 149 in FIG. 2I to be delivered to the Y Axis Compare Circuit in the manner previously described.

In addition OR gate 132, in FIG. 2G, delivers an "up" level compare $Y_L$ signal to the Y Axis Compare Circuit via line 135. The latter signal is effected through the "ANDing" of AND gate 222, in FIG. 2G, by the "up" levels on Y line 211, L line 245, L/S line 213 and the Traverse line 203. The Y Axis Compare Circuit now directs electrode head movement along a Y-oriented "major" line in the direction of decreasing Y-coordinate values toward the target $Y_L$ coordinate. It should be noted that during a Y-oriented "major" line raster scan pattern wherein the alternate "minor" lines are successively directed toward increasing X-coordinate values the Compare $X_U$ line 87 is maintained "up" until the end of the raster pattern. The manner in which this is brought about can more clearly be demonstrated by reference to FIG. 2F. There it can be seen that when "minor" lines are directed toward increasing coordinate values flip-flop 152 is in the "set" state and E "reset" output line 247 is "down." With the E line "down" AND gates 225 and 250, in FIG. 2G, cannot be enabled. Furthermore, since present operation is in a Y-oriented pattern the X output line 277 of flip-flop 150, in FIG. 2F, is also "down" and AND gate 248 in FIG. 2G, also, cannot be enabled. With none of AND gates 225, 248 or 250 enabled the OR gate 223 output is also "down." This latter condition is inverted by Inverter 252 to provide an "up" level to AND gate 88. Since Traverse line 203 is also "up" AND gate 88 provides an "up" level on Compare $X_U$ line 87.

END RASTER SCAN

A series of "major" and "minor" lines are traversed until the electrode head enters the final X direction "minor" line of the raster pattern. The final X direction "minor" line is that line which terminates due to an $X_U$ Compare Signal indication before a distance, equal to the 16 oscillator pulse counts of Counter 242, is traversed. Thus, the purpose of maintaining the $X_U$ Compare signal "up" becomes more evident. Assume the final X direction "minor" line is on the lower Y-coordinate edge of the raster pattern. This is shown at 265 in FIG. 4B. When the X Compares line 126 in FIG. 2B goes "up," thus indicating the X "minor" line traverse of the electrode head has reached the $X_U$ coordinate position the system is readied for a final "major" edge line traverse.

Accordingly, the "up" level on X Compares line 126 is delivered to enable AND gate 230 in FIG. 2F. The "up" level of AND gate 230 is sent to OR gate 254, the output of which is fed to the Gate input 253 of single shot SS4. This enables single shot SS4 such that it may be triggered by a pulse on input line 255 to thus effect the flip-flop change necessary for a new raster pattern. The output of OR gate 254 is also fed to OR gate 244, via line 241, to "set" L/S flip-flop 204 into a "major" line condition. The "setting" of flip-flop 204 "resets" and disables Binary Counter 242 before a Carry pulse is generated. The electrode head then commences to move along an edge line, designated 40 in FIG. 4B, which is the final "major" line of the Y-oriented raster pattern. The raster logic is such that a raster pattern always terminates at the end of a "major" line. When the electrode head, as it moves from $Y_L$ to $Y_U$, reaches the target $Y_U$ coordinate position, Y Compares line 145 in FIG. 2C goes "up." This "up" level is delivered to one of the four inputs of AND gate 226 in FIG. 2F. The remaining three inputs of AND gate 226 are connected, respectively, to the "set" output line 213 of flip-flop 204, the "reset" output line 211 of flip-flop 150 and Traverse line 203. Since all of these lines are "up" AND gate 226 is enabled to provide an "up" level to OR gate 228.

The leading edge of the "up" level output produced by OR gate 228 triggers previously Gate enabled single shot SS4. The "up" level output of OR gate 228 does not this time, however, "reset" flip-flop 204 since the output pulse on line 257 from single shot SS4 as well as the "up" level on the OR gate 254 output line 241 each maintain, via OR gate 244, an "up" level on the "set" input of flip-flop 204 until AND gate 226 is disabled. AND gate 226 is rapidly disabled since the single shot SS4 output pulse is also directly fed, via line 257 to the complementary input of flip-flop 150. In response thereto flip-flop 150 is changed to its "set" state whereupon AND gate 226 is immediately disabled. The changing of flip-flop 150 to its "set" state has the effect of establishing a new X-oriented raster pattern.

The desirability of maintaining flip-flop 204 in its "set" state after traverse of the final "major" line of a pattern is evident when it is noted that a raster pattern not only ends but also begins on a "major" line. The output pulse of SS4, in addition to changing the state of flip-flop 150, also acts to enable AND gate 262 when the states of flip-flops 151 and 152 are such as to enable one or the other of AND gates 258 and 260. Under the conditions being described wherein the final "major" line 40 in FIG. 4B is undergoing completion, flip-flop 151 and 152 are both in the "set" state and AND gate 258 is thus enabled. OR gate 246 delivers this enabled condition to AND gate 262 where it is "ANDed" with the SS4 output pulse to trigger single shot SS6. The output pulse of SS6 is delivered over lines 227 and 261 to the complementary inputs of flip-flops 151 and 152 to change each of their states to the "reset" state. It is to be noted that the single shot SS4 output pulse is also delivered, via line 261, to both the Tape Reader-Programmer of FIG. 1 to indicate a Raster End and to the circuitry of FIG. 2J, the function of which will be explained hereinafter.

With flip-flops 150 and 204 in the "set" state and flip-flops 151 and 152 in the "reset" state, conditions are established to begin traverse of the new X-oriented raster scan pattern with the first "major" line to traverse in the direction of decreasing X-coordinate values and with the ensuing "minor" lines to traverse in the direction of decreasing Y-coordinate values. The position of the electrode would be $X_U$, $Y_U$ and the raster scan logic state is defined by State 3 in FIG. 7.

The "up" level "set" state outputs of flip-flops 150 and 204 are delivered over lines 277 and 213, respectively, to AND gate 268. The "up" level of traverse line 203 is also coupled to AND gate 268. With an "up" level on all three of its inputs, AND gate 268 is enabled. The enabling of AND gate 268 initiates a T Step X instruction on line 239 via OR gate 238. In the same manner as previously described the T Step X instruction initiates, through the circuitry in FIG. 2I, a Step X signal for the X Axis Compare Circuit of FIG. 2B. At the same time the "up" level "set" state outputs of flip-flops 150 and 204 and the "up" level "reset" state outputs of flip-flops 151 and 152 are delivered over lines 277, 213, 245 and 247, respectively, to AND gates 224 and 248 in FIG. 2G. The incident enabling of these latter gates provides both a Compare $X_L$ signal and a Compare $Y_L$ signal via OR gates 124 and 132, respectively. The Compare $Y_L$ signal will remain "up" throughout the X-oriented raster scan pattern for the same reason, as previously explained, the Compare $X_U$ signal remained "up" throughout the Y-oriented raster scan pattern. The Compare $X_L$ signal is sent to the X Compare Circuit of FIG. 2B to initiate movement toward $X_L$.

The X-oriented raster scan pattern continues in the same manner as the described Y-oriented raster scan pattern with the AND gate 266 in FIG. 2F providing the appropriate T Step Y instruction as the state of flip-flop 204 alternately changes during the course of traversing the pattern. As can be seen from the logical connections, AND gate 270 in FIG. 2F is used for an X-oriented pattern with minor lines oriented in the direction of increasing Y coordinate values while AND gate 272 is used for a Y-oriented pattern with minor lines oriented in the direction of decreasing X coordinate values. If the required $Z_L$ depth of the cavity to be cut is not reached another Y-oriented raster scan pattern begins and so on until the $Z_L$ level of depth is reached.

DEPTH OF CUT

The manner in which the depth of cavity is sensed and controlled will be explained in connection with the circuits of FIGS. 2A, 2D and 2J. As previously explained, the novel system as provided by the present invention includes means to periodically calibrate the cutting element to automatically renew its length. It can be seen that the more frequent the calibration the more accurate the control over electrode length and, accordingly, the finer the degree of accuracy and smoothness in the depth of cut. For these reasons additional means are provided to increase the frequency of calibration near the bottom of the cavity. It is to be understood that electrode head movement in the Z direction never occurs while the head is traversing in the X-Y plane. Further, it should be noted that any time the electrode head is descending to or traversing in the X-Y plane the Compare $Z_L$ line 153 of flip-flop 156, in FIG. 2E, is "up." This "up" level enables Gate 154 in FIG. 2D to effect a continuous comparison, in Z Digital Comparator 115, of the current Z coordinate position level with the target $Z_L$ coordinate position level. During the descending to or traversing in the X-Y plane, then, the Z Digital Comparator will continuously provide either a Sensor Less Than Z signal or a Z Compares signal. There are two instances during operation on the workpiece when the electrode head is allowed to move in the Z direction. The first instance occurs when the electrode arc current drops below 3 amps. to thus initiate a sequence to advance the electrode head to a lower Z level. The second instance occurs during the periodic calibrate sequences.

In the first instance electrode arc current is sensed by transformer 12, in FIG. 1, and delivered over line 41 to Amplitude Comparator 162 in FIG. 2A. A sensed current condition of at least 3 amps. indicates the electrode is sufficiently close to the workpiece to provide effective cutting and adequate control. It should be noted that the system is continuously monitoring and under control of the minimum 3-amp. current condition. A sensed current of less than 3 amps. indicates that the electrode is too far from the workpiece and that traverse in the X-Y plane should cease to allow the electrode head to advance in the Z downward direction. Advancement in the Z direction will terminate when either a current greater than 3 amps. is sensed or a Z Compares signal is generated by Z Digital Comparator 115 in FIG. 2D.

If a current of greater than 3 amps. is sensed, then traverse in the X-Y plane will again commence. If a Z Compares signal is generated traverse in the X-Y plane will also commence. At this latter point the rate at which the calibration sequence occurs will also increase. However, depending upon the uniformity of the bottom of the cavity, traverse in the X-Y plane initiated by a Z Compares signal may be limited. If, at the end of the current raster scan pattern in which the electrode is operating, a Z Compares signal is still being generated, then, conditions are set for the next raster scan pattern to possibly be the final one. This next raster scan pattern is final if the return of the electrode to the workpiece after each calibration sequence occurring during this pattern results in the electrode reaching the $Z_L$ Compares level before a 3-amp. current indication is generated. Then, traverse in the X-Y plane terminates and control is returned to the Tape Reader-Programmer.

The generation of a Z Compares signal at each of the frequent points in the X-Y plane at which calibration occurs would indicate that a cavity has been eroded which is both of uniform and of required $Z_L$ depth. If, however, during this time the return of the electrode after any calibrate sequence results in a 3 amps. signal indication being generated before a Z Compares signal, traverse will, of course, commence but this would indicate that the bottom of the cavity is not uniformly at the required $Z_L$ depth. Successive raster scan patterns would then be generated until the stated condition is obtained.

The second instance in which the electrode head is allowed to move in the Z direction occurs during the calibration sequence. This sequence occurs periodically at a time when the 3 amps. condition is present. When a calibrate instruction is sent to the Position Controller and Sequencer from the Calibrate Sequence Controller of FIG. 3 the electrode head stops, goes to calibrate and then returns to the same X-Y coordinates. Upon return, the Z coordinate level of the electrode head is determined by allowing same to descend until either a current greater than 3 amps. signal indication, I>3, or a Z Compares signal is generated. The detailed manner in which the depth of cavity is sensed and controlled will now be explained.

DEPTH OF CUT CONTROL

When the electrode arc current sensed by transformer 12 in FIG. 1 is maintained above 3 amps. the output of Amplitude Comparator 162 in FIG. 2A delivers to SS1 pulses of constant amplitude in synchronism with the pulses received from transformer 12. SS1 is of a design such that its output will remain up as long as it is pulsed more frequently than its natural delay. When electrode arc current drops below 3 amps., the Amplitude Comparator 162 ceases to provide input pulses to SS1 and its output will drop shortly thereafter. Accordingly, the output of AND gate 182 in FIG. 2A drops and this condition is sent over line 183 to terminate conduction in OR gate 202, in FIG. 2I, to thus cause the Traverse line 203 to drop to its "down" level. As previously explained this stops traverse in the X-Y plane. At the same time the "down" level of the I>3 line 183 in FIG. 2I is inverted by Inverter 190 to enable AND gate 168 which in turn enables AND gate 160 to provide a pulsed Step Z Down signal on line 197. This signal is sent to FIG. 2D to move the electrode head down until either a current greater than 3 amps. is sensed or a Z Compares signal is generated by the Z Digital Comparator in FIG. 2D. It is clear from FIG. 2E that when a current greater than 3 amps. is sensed, the conditions causing traverse in the X-Y plane are reestablished. It should be remembered that during electrode head descent to or traverse in the X-Y plane the Compare $Z_L$ line 153 in FIG. 2E is always "up." If a Z Compares signal is generated it it sent, via line 119, to Inverter 196 in FIG. 2E to disenable AND gate 160 and terminate the Step Z Down signal. The Z Compares signal is also sent to OR gate 202 in FIG. 2I to reestablish the traverse condition. Traverse in the X-Y plane, then, again commences.

BOTTOM SEQUENCE

Figure 2H:
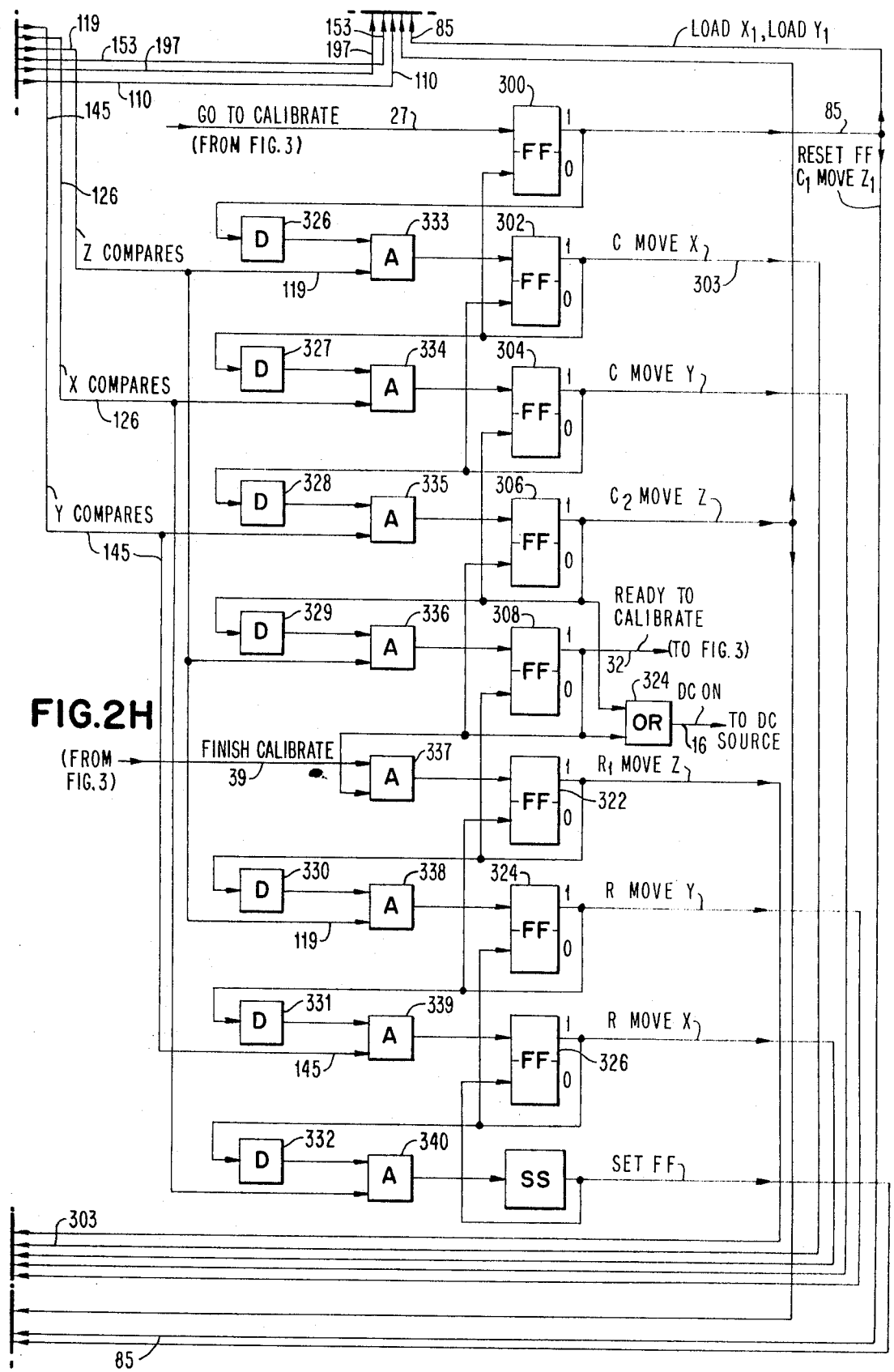
Figure 2J:
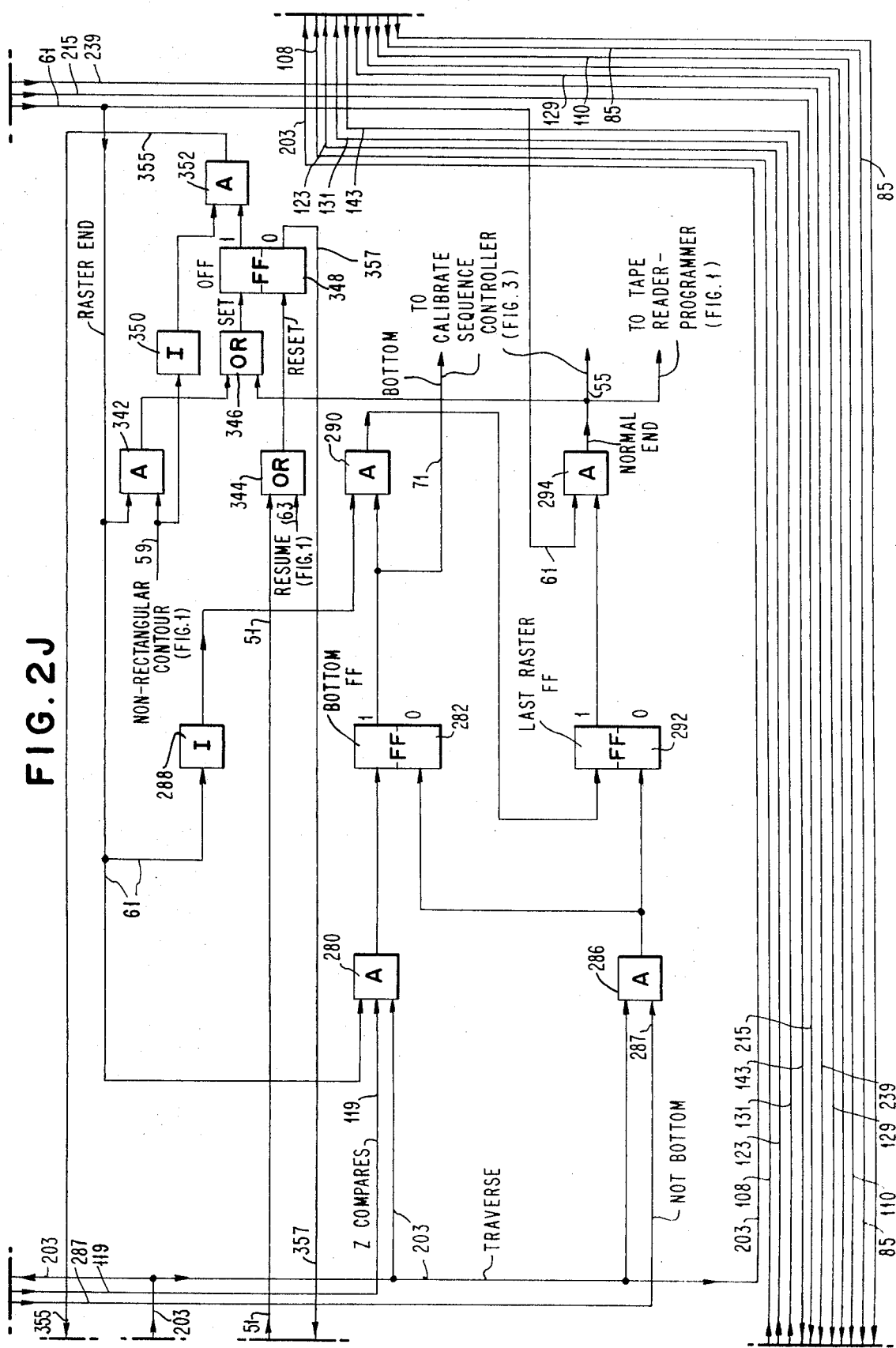

Initiation of traverse in the X-Y plane in response to a Z Compares signal also conditions the circuitry of FIG. 2J for a "bottom" sequence. Accordingly, the Z Compares signal as well as the Traverse signal are fed to AND gate 280 in FIG. 2J. When the raster scan pattern during which the Z Compares signal was generated ends, AND gate 280 receives a Raster End pulse over line 61 from FIG. 2F. If the Z Compares signal is still present at Raster End time, then, AND gate 280 is enabled to set Bottom flip-flop 282. The Bottom signal output indication of flip-flop 282 is sent, via line 71 to "set" flip-flop 284 in FIG. 3. The setting of flip-flop 284 lowers the level of Level Sensor 15 in FIG. 1, via line 20, to thereby increase the rate of occurrence of calibration.

When the Raster End pulse terminates, the Inverter 288 output level, in FIG. 2J, enables AND gate 290. The output of AND gate 290 "sets" Last Raster flip-flop 292. With these conditions set, another, and possibly the final, raster scan pattern begins. If during the execution of this potentially final raster scan pattern, traverse after each calibration sequence is initiated by a Z Compares signal upon descent of the electrode head, then, a Normal End signal will be generated by AND gate 294 in FIG. 2J when a Raster End pulse enables AND gate 294 over line 61. The Normal End Signal "sets" flip-flop 348, via OR gate 346, and flip-flop 348 enables OR gate 354, in FIG. 2E, to move the electrode to its uppermost position. If, however, after any one of the calibration sequences, traverse in the X-Y plane is initiated by a current greater than 3 amps. signal indication, because the electrode reached that level of closeness to the workpiece before the electrode head reached the $Z_L$ level, then, a continuous Sensor Less Than Z signal will be generated on line 117 by the Z Digital Comparator of FIG. 2D. This signal will pass through OR gate 118 therein and be delivered, as a NOT Bottom signal indication over line 287, to AND gate 286 in FIG. 2J. When the Traverse line 203 goes "up" to initiate traverse in the X-Y plane AND gate 286 will "reset" flip-flop 292. With flip-flop 292 "reset," AND gate 294 will not be enabled when the Raster End pulse appears. AND gate 286 will also "reset" flip-flop 282. This will cause Bottom line 71 to go "down" thus, disenabling AND gate 290. The circuitry of FIG. 2J will remain this way until another Z Compares signal is received. It is to be noted that in the Nonrectangular Mode a Raster End pulse, generated after each scan line, enables AND gate 342 to "set" flip-flop 348. Flip-flop 348 in turn disenables AND gate 356 in FIG. 2E to thus turn off the EDM power supply. A Resume signal sent by Tape Reader-Programmer 42, via line 63, "resets" flip-flop 348.

CUTTING SPEED CONTROL

As has been shown, the system according to the preferred embodiment of the present invention maintains the electrode at a distance from the workpiece consistent with the generation of at least an electrode arc current greater than 3 amps. Provision has also been made to reduce the traverse speed of the electrode in the X-Y plane to one fourth its normal running speed when the electrode arc current becomes greater than 5 amps. This is accomplished by the circuitry of FIGS. 2A and 2I. When the electrode arc current, as sensed by transformer 12 in FIG. 1, increases to a value greater than 5 amps. Amplitude Comparator 164, in FIG. 2A, generates an I>5 signal indication. This signal triggers single shot SS2. The "up" output level of single shot SS2 is delivered to enable AND gate 184. The "up" level of AND gate 184 is inverted by Inverter 192, in FIG. 2I, to disenable AND gate 216. The "up" level is also sent, uninverted, to enable AND gate 274 in FIG. 2I. The output pulses of AND gate 214 in FIG. 2I, which are synchronized with Oscillator 113, are then fed to 4-bit Binary Counter 276 where every fourth pulse is passed through AND gate 274 to OR gate 235. The output of OR gate 235, then, performs as previously to provide either a Step X or Step Y pulse, but at one-fourth the rate. This one-quarter speed provides more accuracy and allows better control of cutting at the bottom of the cavity.

RECALIBRATE ON I>7 AMPS.

Provision has also been made in the Position Controller AND Sequencer of the present invention, to initiate a calibrate sequence when an electrode arc current greater than 7 amps. is sensed by transformer 12 in FIG. 1. A current of greater than 7 amps. indicates the electrode is approaching an obstruction, high point or an irregularity in the electrode path. In response to a sensed current of this magnitude, Amplitude Comparator 166 in FIG. 2A delivers an I>7 signal indication to single shot SS3. The "up" output level of single shot SS3 is sent over line 189 to the Calibrate Sequence Controller of FIG. 3, the detailed operation of which will be explained hereinafter.

The I>7 signal indication sent to the Calibrate Sequence Controller has the same affect as the Cumulative I signal indication from Level Sensor 15 in FIG. 1 in that it initiates a calibrate sequence. The I>7 signal indication is also sent over line 189 to Inverter 194 in FIG. 2I where it is inverted to disenable AND gate 214, thus terminating its periodic output pulses. With the output pulses of AND gate 214 terminated, AND gate 216 becomes disenabled. This, then, terminates the periodic output pulses of OR gate 235 and whichever of the incident Step X or Step Y periodic pulse signals that are being used to move the electrode head in the X-Y plane.

At the same time the I>7 signal indication in FIG. 2A is inverted by Inverter 188 to disenable AND gate 182 and cause the I>3 signal indication on the AND gate 182 output line 183 to go "down." In response thereto OR gate 202 in FIG. 2I changes the "up" signal level on Traverse line 203 to a "down" level. This "down" level in turn disenables whichever of the AND gates in FIG. 2F that are enabled so as to terminate whichever of the T Step X or T Step Y signals that are active at the time. In the same manner the "down" level of Traverse line 203 also terminates whichever of the Compare signals instructions of FIG. 2G that are active at the time.

Thus, electrode traverse motion in the X-Y plane is stopped and the system is ready to begin a calibrate sequence wherein the electrode is withdrawn from the cavity and positioned over the designated reference point. The stopping of traverse motion in response to an I>7 signal indication prevents the electrode from fusing to the bottom of the cavity when an obstruction, high point or irregularity, therein, is encountered. If the obstruction is relatively large several calibrate sequence cycles will be initiated until the electrode has incrementally burned and, if necessary, in steplike fashion climbed over any unburned portion. The manner in which the calibrate sequence functions will be explained hereinafter. However, it should first be noted, as is evident, that the less than 3 amps., the 3 to 5 amps. and the 5 to 7 amps. current ranges disclosed are only exemplary of any number of current ranges that could be used. The amplitude comparators of FIG. 2A could readily be adjusted to provide different ranges.

CALIBRATE SEQUENCE CONTROLLER

The Calibrate Sequence Controller 22, in FIG. 1, is shown in detail in FIG. 3. As hereinbefore explained the Calibrate Sequence Controller, as shown in FIG. 1, initiates a calibrate sequence in response to either a signal on I>7 line 189 or Cumulative I, line 18. The Controller is also responsive to an "up" signal on Bottom line 71 to lower the threshold level of Level Sensor 15 over Low Level line 20. The detailed manner in which these operations are performed will be described in connection with the Position Controller and Sequencer circuitry shown in FIG. 2.

It will be remembered that a Z Compares signal indication on line 119 "sets" flip-flop 282 in FIG. 2J if it is present at the end of a raster scan pattern. The setting of flip-flop 282 presents an "up" level Bottom signal, over line 71, to flip-flop 284 in FIG. 3. Flip-flop 284 is thereby "set," thus causing Level Sensor 15 in FIG. 1 to go to its low level. Calibration now occurs more frequently.

If at any time during the course of the final raster scan pattern, the Z Compares signal indication in FIG. 2D is displaced by a Sensor Less Than Z signal indication, then, OR gate 118 therein and line 287 therefrom will deliver a NOT Bottom signal indication to AND gate 286 in FIG. 2J. AND gate 286 is thereby enabled to "reset" flip-flop 292 thus indicating that this is not the final raster scan pattern. AND gate 286 will also "reset" flip-flop 282 to remove the Bottom signal indication on line 71. However, this will not affect the "set" state of flip-flop 284 in FIG. 3 and the low level of Level Sensor 15 in FIG. 1, and the consequent higher rate of calibration will be maintained. The reason for maintaining the higher rate of calibration is that a Z Compares signal at some point along the bottom of the cavity indicates that although the total surface area of the bottom of the cavity may not be uniformly at the required $Z_L$ depth, it is closely approaching this depth and, thus, the increased rate calibration will improve the accuracy and smoothness of the depth of cut.

CALIBRATION CONTROL

Integrator 13 and Level Sensor 15, in FIG. 1, provide the timing circuitry necessary to control the rate of calibration. Integrator 13 integrates the electrode arc current. It should be noted that as the electrode draws more arc current the rate of electrode work increases but unavoidable the rate of electrode wear also increases. However, by using the electrode arc current as the current source in the Integrator-Level Sensor timing circuitry, as provided by the present invention, the calibration rate correspondingly increases to renew the electrode proportionately more often. Thus, the electrode arc current controls the rate at which the Integrator builds up voltage. When the level of voltage reaches the threshold voltage level of Level Sensor 15 the latter delivers a Cumulative I signal indication over line 18 to the Calibrate Sequence Controller. OR gate 296 of the Calibrate Sequence Controller, shown in FIG. 3, is thus enabled. As previously explained, air I>7 signal indication from FIG. 2A will also enable OR gate 296. OR gate 296 "sets" flip-flop 298 to thereby deliver an "up" level Go To Calibrate signal indication, over line 27, to the circuitry of FIG. 2H.

The sequential operation of the circuitry of FIG. 2H is the same as the sequential operation previously explained in reference to the flip-flops 107, 122 and 130 in FIG. 2E. AND gates 333 through 340 and Delay devices 326 through 332 in FIG. 2H perform in the same manner as the corresponding AND gates and Delay devices in FIG. 2E and therefore they will not be referred to specifically hereinafter. The Go To Calibrate signal indication received on line 27 in FIG. 2H "sets" flip-flop 300. The setting of flip-flop 300 produces an "up" level on its output line 85 to provide four separate signal instructions.

The first, a Reset FF signal instruction, enables OR gate 310 in FIG. 2E to "reset" flip-flop 156. The EDM power supply is thus turned off and the Compare $Z_L$ signal indication is terminated to disenable Gate 154 in FIG. 2D, At the same time a calibrate $C_1$ Move $Z_1$ signal instruction is sent to enable OR gate 109 in FIG. 2G to generate a Move Z Up signal instruction. The effect of enabling OR gate 109 is the same as that previously described in regard to the initial I Move Z Signal instruction. Namely, AND gate 205 in FIG. 2I is disenabled via Inverter 207 to terminate traverse in the X-Y plane, AND gate 111 in FIG. 2E is enabled to move the electrode head in the upward Z axis direction and Gate 102 in FIG. 2D is enabled to provide comparison of the electrode head movement with the target $Z_1$ zero value coordinate position. Finally, as the $C_1$ Move $Z_1$ instruction acts to terminate traverse in the X-Y plane a Load $X_1$ and Load $Y_1$ signal instruction are delivered via line 85 to enable, respectively, Gate 80 in the X Axis Compare Circuit of FIG. 2B and Gate 312 in the Y Axis Compare Circuit of FIG. 2C. At termination of traverse, then, the X- and Y-coordinate values of the electrode head position, as determined by the X and Y Digital Position Sensors, are delivered, respectively, over lines 28 to the $X_1$ Register 74 of FIG. 2B and over lines 29 to the $Y_1$ Register 314 of FIG. 2C to be stored therein.

The electrode head moves up until it reaches the target position defined by the $Z_1$ coordinate value stored in Register 100 in FIG. 2D. A Z Compares signal then "sets" flip-flop 302 in FIG. 2H. Flip-flop 302 in turn "resets" flip-flop 300 and further provides a C Move X signal instruction, over line 303, to enable OR gate 127 in FIG. 2G. OR gate 127 in response thereto produces an M Step X signal instruction to move the electrode head in the X direction. The C Move X signal indication in FIG. 2G also acts to provide a Compare $X_0$ signal indication to enable Gate 83 in FIG. 2B. With Gate 83 enabled the value of the $X_0$ coordinate stored in Register 75 becomes the target position.

When the electrode head reaches the $X_0$ target position, an X Compares signal indication "sets" flip-flop 304 in FIG. 2H. With flip-flop 304 "set," in like manner, the electrode head moves to the $Y_0$ coordinate position and a Y Compares signal is generated. The Y Compares signal "sets" flip-flop 306 to move the electrode head to the $Z_0$ target position. The $X_0$, $Y_0$ and $Z_0$ coordinates are predetermined values calculated to position the electrode head over a reference point of known height.

When the $Z_0$ target position is reached, flip-flop 308 in FIG. 2H is "set" to provide a Ready to Calibrate signal instruction, via line 32, to AND gate 316 in FIG. 3. This latter signal also functions as the Reset Cumulative I signal instruction to reset Integrator 13 in FIG. 1, via line 19. The "set" state of flip-flop 308 also enables OR gate 324 in FIG. 2H, the output of which provides a DC On signal instruction over line 16 to turn on DC Source 10 in FIG. 1. Since flip-flop 298, in FIG. 3, is "set," AND gate 316 therein is enabled to provide a Calibrate Motor Drive signal instruction, over line 33, to calibrate motor 7 in FIG. 1. This motor, then, rotates wire reel 8, in the direction indicated by the arrow thereon, to feed the wire electrode through electrode guide 14 until contact is made with the conductive reference point 17.

When contact is made the voltage drop across the resistor 34-35 voltage divider of FIG. 1 provides a Calibrate Contact signal instruction, over line 37, to flip-flop 298 in FIG. 3. Flip-flop 298 is thus "reset" and the resultant "down" level on its output line 27 is inverted by Inverter 318 to provide a Finish Calibrate output signal instruction on line 39. This latter signal is sent to FIG. 2H to "set" flip-flop 322. Flip-flops 322, 324 and 326, then, reverse the process just encountered in going to calibrate by performing in the same sequential manner as flip-flops 300, 302, 304, 306 and 308. The electrode head is then removed from the reference coordinate position and repositioned to its original $X_1$, $Y_1$ coordinate position stored in Registers 74 and 314 in FIGS. 2B, and 2C. Thereafter the system continues to traverse in the same manner as it was traversing prior to the interruption for a calibrate sequence.

It is to be understood that while the system in accordance with the present invention has been described with reference to an EDM work element, other work elements may just as well have been used. The only requirement is that the work element be of such a nature that it functions while being moved such that it is capable of being scanned in a sweeping manner. For example, instead of the EDM electrode work element a laser beam could be used for cutting with an interferometer arrangement used to sense and control the depth of cut. A jet stream of abrasive fluid with appropriate sensing means might also be used.

While the invention has been particularly shown and described with reference to a preferred embodiment thereof, it will be understood by those skilled in the art that the foregoing and other changes in form and details may be made therein without departing from the spirit and scope of the invention.

What we claim is:

1. In a numerical control system for controlling a nonmechanical cutting element which cuts effectively within a prescribed range of distances from the workpiece including:

control circuit means for controlling traverse cutting movement of said cutting element in a plane orthogonal to the direction of said range of distances from the workpiece;

sensing means to sense when said nonmechanical cutting element is outside said prescribed range of distances from said workpiece;

means to terminate the traverse cutting movement of said cutting element in said plane when said sensing means senses that said cutting element is outside said prescribed range of distances from said workpiece; and means responsive to said means to terminate to move said cutting element to within said prescribed range of distances from said workpiece.

2. In an electrical discharge machine tool control system using a renewable wire electrode to operate on an electrically conductive workpiece in the X-Y plane wherein the electrode length extending from the electrical head thereof is automatically renewed in accordance with the amount of wear;

means to move said electrode over said workpiece to traverse a predetermined pattern in said X-Y plane;

means to sense the amount of discharge current passing between said electrode and said workpiece, the amount of said current being proportional to the rate of wear of said electrode;

first control means responsive to said discharge current to produce control signals at a frequency proportional to the amount of said discharge current sensed; and second control means responsive to said control signals to calibrate and renew said electrode length whereby the frequency of calibration is proportional to the rate of electrode wear.

3. A system as defined in claim 2 wherein said first control means includes means to increase the frequency of said control signals for a given amount of discharge current to thereby increase the frequency of calibration whereby finer accuracy and uniformity in the depth of cut are provided.

4. In an electrical discharge machine tool control system using a regenerative wire electrode as the work tool to traverse an electrically conductive workpiece;

means to continuously sense the amount of discharge current passing between said electrode and said workpiece during traverse;

calibrate means responsive to said sensed current to maintain the electrode length within a specified range of lengths, said means thus acting to maintain said electrode within a prescribed maximal distance from said workpiece during said traverse; and further means responsive to said sensed current to maintain said electrode beyond a prescribed minimal distance from said workpiece whereby said electrode is maintained within a prescribed range of distances from said workpiece as defined by said maximal and minimal distances to thereby increase efficiency and accuracy and to prevent contact between said workpiece and said electrode.

5. A system as defined in claim 4 wherein said further means includes control means to terminate said traverse when said electrode reaches said prescribed minimal distance from said workpiece and to engage said calibrate means to thus prevent possible fusing between said electrode and said workpiece and to cause said electrode to withdraw from said workpiece to thereby automatically renew said electrode length in accordance with the amount of electrode that has been eroded.

6. A system as defined in claim 5 wherein said control means includes means to cause said calibrate means to initiate return of said electrode to the position over said workpiece from whence it was withdrawn after regeneration of eroded electrode with additional means to terminate said return at said prescribed maximal distance from said workpiece whereby traverse is resumed with a renewed electrode at a new distance from said workpiece.

7. In a machine tool control system for controlling the operation of a material removal work tool on a workpiece to cause a rectangular cavity to be formed therein the length, width and depth of which is defined by X-, Y- and Z-rectangular coordinate limits;
a work tool operative to remove material when scanned across said workpiece;
storage means for storing the said X-, Y- and Z-rectangular coordinate limits of said rectangular cavity;
means for continuously sensing the current X-, Y- and Z- coordinate positions of said work tool;
X-, Y- and Z-compare circuit means for comparing the respective X-, Y- and Z-current coordinate positions of said work tool with the respective X-, Y- and Z-coordinate limits stored in said storage means such that selective and individual enablement of one of said compare circuit means generates a corresponding compare signal when the current coordinate position corresponding to the enabled compare circuit means compares with the coordinate value stored in the corresponding of said storage means;
control circuit means responsive to said compare circuit means for causing said work tool to repetitively scan said workpiece between said X–Y coordinate limits in a successive line-by-line cutting operation to form a rectangular raster scan pattern to thereby remove incremental layers of material from said workpiece in the Z-direction;
means to generate a raster end signal at the end of each of said rectangular raster scan patterns;
means response to both a compare signal from said Z-compare circuit means, continuous throughout a scan of an entire raster pattern, and a raster end signal generated at the end of said raster pattern to thereby terminate machine operation.

8. In a machine tool control system for repetitively sweeping a material removal work tool over a workpiece between both a set of X and a set of Y coordinate limits to thereby form a rectangular cavity having a depth defined by a Z-coordinate limit;
input means to said control system to provide digital input data including said set of X and set of Y coordinate limits and said Z-coordinate limit;
storage means for storing said input data provided by said input means;
means for indicating the current X-, Y- and Z-coordinate position of said work tool;
X-, Y- and Z-compare circuit means for comparing said current coordinate position of said work tool with said X-, Y- and Z-coordinate limits stored in said storage means;
control means causing said work tool to traverse said workpiece to form a closely spaced X-oriented parallel line pattern with additional means responsive to said X-compare circuit means to cause the lengths of said X-oriented parallel lines to be limited and defined by said set of X-coordinate limits and wherein said additional means includes means responsive to said Y-compare circuit means to cause the lateral spread of said closely spaced X-oriented lines to be limited and defined by said set of Y-coordinate limits;
shifting means responsive to said Y-compare circuit means for orthogonally shifting said control means and causing said work tool to traverse said workpiece to form a closely spaced Y-oriented parallel line pattern with said additional means being responsive to said Y-compare circuit means to cause the length of said Y-oriented parallel lines to be limited and defined by said set of Y-coordinate limits and wherein said additional means includes means responsive to said X-compare circuit means to cause the lateral spread of said closely spaced Y-oriented lines to be limited and defined by said set of X-coordinate limits;
means to operate said shifting means after complete traverse of each type pattern whereby tool operation is alternately switched between X-oriented and Y-oriented patterns;
means to generate a pattern end signal after complete traverse of each of said patterns;
means responsive to both a compare signal from said Z-compare circuit means indicating arrival of said work tool at the cavity depth defined by said Z-coordinate limit and said pattern end signal to thereby disenable said control system whereby operation of said control system is terminated.

9. A system as defined by claim 8 with means to sense the rate at which work is being performed by said work tool with additional means responsive to said means to sense to periodically calibrate said work tool at a calibration rate proportional to the rate at which work is being performed whereby accuracy and uniformity in the depth of cut is provided.

10. A system as defined by claim 9 with additional means to maintain the distance said work tool and said workpiece within a specified range of distances.

11. A machine tool control system for controlling material removal movement of an energy emitting work tool over a workpiece comprising:
first control means for sweeping said work tool in a raster scan pattern over said workpiece in a planar scanning operation between preselected limits to remove an incremental layer of material from said workpiece between said limits;
means for sensing the amount of energy passing between said work tool and said workpiece during said planar scanning operation to determine an energy condition wherein said energy is outside a preselected energy range; and
second control means responsive to said energy condition sensed by said means for sensing to periodically interrupt said planar scanning operation and effect movement of said work tool orthogonal to the plane of said planar scanning operation to cause said scan pattern to be repeated unobstructed at progressively greater depths until a predetermined depth of material is removed.

12. In a machine tool control system for numerical control of the X-Y-Z movement of a scan type energy emitting material removal work tool operating on a workpiece;
first control circuit means causing said work tool to scan said workpiece in an X-Y plane scanning operation between preselected stored limits;
sensing means to sense the energy flow between said work tool and workpiece during said scanning operation;
second control circuit means for interrupting said scanning operation and controlling the Z-direction position of said work tool in response to and in accordance with whether said energy flow is above or below a preselected energy range; and means to resume said scanning operation after said second control circuit means controls said Z-direction position.

13. A machine tool control system for moving a scan-type material removal work element over a workpiece between X-, Y- and Z-direction coordinate limits defined by digitally coded numerical input data comprising:

first control circuit means moving said work element in a scanning manner over said workpiece to provide thereon straight lines of cut of incremental Z-direction depth between said X- and Y-limits in directions parallel to the X- and Y-axes;

means to sense the distance between said work element and said workpiece while said work element is scanning over said workpiece;

second means to terminate said scanning when said distance is outside of a preselected range wherein said work element is either too close or too far from said workpiece, said second means including means to incrementally move said work element away from said workpiece when said work element is too close to said workpiece and then resume scanning and means to incrementally move said work element toward said workpiece when said work element is too far from said workpiece and then resume scanning; and means to finally terminate said scanning when the Z-direction depth of cut reaches said Z-coordinate limit defined by said input data.

14. A numerical control system for moving a material removal work element in a scan pattern over a workpiece to erode a rectangular cavity in accordance with sets of X- and Y-rectangular coordinate limits and a Z-coordinate depth limit comprising:

input means defining said X-, Y- and Z-limits;

logic control circuit means for moving said work element in the X-direction between said sets of X-limits to form a raster scan pattern of consecutive X-oriented parallel major lines alternately connected at the ends thereof by Y-direction minor lines the length of which are of a lesser magnitude than said parallel major lines;

means for orthogonally shifting said pattern after said work element has traversed a full pattern of said consecutive X-oriented major lines from one of said Y-coordinate limits to the other such that said parallel major lines extend between said Y-limits to form a Y-oriented major line raster scan pattern from one of said X-coordinate limits to the other;

means for continuously sensing the distance between said work element and said workpiece during said scan pattern and providing an indication when said work element is outside a preselected range of distances from said workpiece;

means responsive to said indication to move said work element in the Z-direction so that said work element is within said preselected range of distances; and means for continuously alternating said pattern between X-oriented and Y-oriented raster scan patterns so as to erode a rectangular cavity having a Z-depth in accordance with said Z-coordinate depth limit.

15. A system as defined in claim 14 wherein said work element is a renewable wire electrode used in an electrical discharge machining arrangement and wherein further means are provided to periodically calibrate said wire electrode to renew the length thereof in accordance with the amount of wear.

16. A system as defined in claim 15 wherein further means are provided to increase the frequency of calibration when said work element approaches said Z depth limit, whereby finer accuracy and uniformity in the depth of erosion are provided.

17. In an electrical discharge machine tool control system using a renewable wire electrode as the work tool wherein said wire electrode work tool is automatically traversed across an electrically conductive workpiece;

first control means for sweeping said electrode in a scan pattern over said workpiece in a planar scanning operation between preselected limits;

sensing means to continuously sense the amount of electrode discharge current passing between said electrode and said workpiece, the amount of said electrode discharge current sensed being a function of the distance between said electrode and said workpiece; and means responsive to the said sensed current outside a preselected range of discharge currents to automatically interrupt said planar scanning operation and effect movement of said electrode orthogonal to the plane of said planar scanning operation to thereby maintain said electrode within a predetermined range of distances from said workpiece corresponding to said preselected range of discharge currents.

18. An electrical discharge machine tool control system as set forth in claim 36 wherein said means responsive includes further means to cause said wire electrode to be extended to renew its length in accordance with the amount of wear whereby the length of said electrode is maintained within selected limits to thus increase the accuracy of work performed thereby.

19. An electrical discharge machine tool control system as set forth in claim 18 including further means responsive to said sensing means to reduce the speed of scanning of said electrode when said electrode discharge current exceeds a predetermined amount within said preselected range of discharge currents.